US009628606B2

(12) United States Patent
Oh et al.

(10) Patent No.: US 9,628,606 B2
(45) Date of Patent: Apr. 18, 2017

(54) COVER, AN ELECTRONIC DEVICE USING THE SAME AND OPERATING METHOD THEREOF

(71) Applicant: Samsung Electronics Co., Ltd., Suwon-si, Gyeonggi-do (KR)

(72) Inventors: Hun-Cheol Oh, Seoul (KR); Soo-Hyung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/163,426

(22) Filed: Jan. 24, 2014

(65) Prior Publication Data
US 2014/0204511 A1    Jul. 24, 2014

(30) Foreign Application Priority Data

Jan. 24, 2013 (KR) .......................... 10-2013-0007966

(51) Int. Cl.
G06F 3/00 (2006.01)
H04M 1/725 (2006.01)
G06F 1/16 (2006.01)
H04M 1/04 (2006.01)

(52) U.S. Cl.
CPC ...... *H04M 1/72575* (2013.01); *G06F 1/1632* (2013.01); *H04M 1/04* (2013.01); *G06F 2200/1633* (2013.01); *G06F 2200/1634* (2013.01); *H04M 2250/04* (2013.01); *H04M 2250/12* (2013.01); *H04M 2250/16* (2013.01)

(58) Field of Classification Search
CPC ..................................................... G06F 3/0486
See application file for complete search history.

(56) References Cited

U.S. PATENT DOCUMENTS

| 8,824,136 B1* | 9/2014 | Interian et al. .......... 361/679.41 |
| 2012/0194448 A1* | 8/2012 | Rothkopf ............ A45C 13/002 345/173 |
| 2013/0328917 A1* | 12/2013 | Zambetti et al. ............. 345/620 |
| 2014/0159867 A1* | 6/2014 | Sartee et al. ................... 340/6.1 |

* cited by examiner

Primary Examiner — Henry Tsai
Assistant Examiner — Juanito Borromeo
(74) Attorney, Agent, or Firm — Jefferson IP Law, LLP

(57) ABSTRACT

A method for operating an electronic device including an electronic cover device is provided. The method includes coupling the electronic cover device to the electronic device, determining a type of the electronic cover device, and setting an interface based on the type of the electronic cover device.

27 Claims, 35 Drawing Sheets

| Type | OUTER INPUT/OUTPUT DEVICE (211) | | | INNER INPUT/OUTPUT DEVICE (212) | | |
|---|---|---|---|---|---|---|
| 1 | E-INK | TOUCH PANEL | DIGITIZER | COLOR DISPLAY | TOUCH PANEL | DIGITIZER |
| 2 | E-INK | – | DIGITIZER | COLOR DISPLAY | TOUCH PANEL | DIGITIZER |
| 3 | E-INK | TOUCH PANEL | – | COLOR DISPLAY | TOUCH PANEL | – |
| 4 | E-INK | – | – | COLOR DISPLAY | TOUCH PANEL | – |

FIG.4A

| Type | OUTER INPUT/OUTPUT DEVICE (211) | | | INNER INPUT/OUTPUT DEVICE (212) | | |
|---|---|---|---|---|---|---|
| 1 | - | - | - | COLOR DISPLAY | TOUCH PANEL | DIGITIZER |
| 2 | - | - | - | COLOR DISPLAY | TOUCH PANEL | - |
| 3 | E-INK | TOUCH PANEL | DIGITIZER | - | - | - |
| 4 | E-INK | - | DIGITIZER | - | - | - |

FIG.4B

| Type | TRANSPARENT ALL-IN-ONE INPUT/ OUTPUT DEVICE | | |
|---|---|---|---|
| 1 | – | E-INK | TOUCH PANEL |
| 2 | – | E-INK | – |
| 3 | COLOR DISPLAY | – | TOUCH PANEL |

FIG.4C

COVER, AN ELECTRONIC DEVICE USING THE SAME AND OPERATING METHOD THEREOF

CROSS-REFERENCE TO RELATED APPLICATION(S)

This application claims the benefit under 35 U.S.C. §119 (a) of a Korean patent application filed on Jan. 24, 2013 in the Korean Intellectual Property Office and assigned Serial number 10-2013-0007966, the entire disclosure of which is hereby incorporated by reference.

TECHNICAL FIELD

The present disclosure relates to an electronic cover device which is removable, an electronic device using the same, and an operating method thereof. More particularly, the present disclosure relates to a removable electronic cover device for protecting, opening, and closing an electronic device.

BACKGROUND

Electronic devices have become a necessity due to high portability and have developed into multimedia devices that provide various services. An electronic device adopts a high-quality display in accordance with development of Graphic User Interface (GUI) system.

Mostly, an electronic device includes a single display for displaying various information. In recent years, electronic devices have evolved to include a high-resolution large display screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a removable electronic cover device for protecting, opening, and closing an electronic device, and an operating method thereof.

Another aspect of the present disclosure is to provide an electronic device for setting an interface based on information of at least one input/output device of an electronic cover device, and an operating method thereof.

In accordance with an aspect of the present disclosure, a method for operating an electronic device including an electronic cover device is provided. The method includes coupling the electronic cover device to the electronic device, determining a type of the electronic cover device, and setting an interface based on the type of the electronic cover device.

In accordance with another aspect of the present disclosure, an electronic device is provided. The electronic device includes a main body comprising a main display, an electronic cover device electrically or functionally coupled to the main body and covering at least a part of the main display, and a processor configured to determine a type of the electronic cover device and to set a user interface according the type of the electronic cover device.

In accordance with yet another aspect of the present disclosure, an electronic cover device is provided. The electronic cover device includes a first cover corresponding to a first side of an electronic device and comprising at least one input/output device in a front side or a back side, and a second cover corresponding to a second side of the electronic device, removable, and communicating with the first cover.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, and 4C illustrate various specifications of an input/output device of an electronic cover device according to an embodiment of the present disclosure;

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
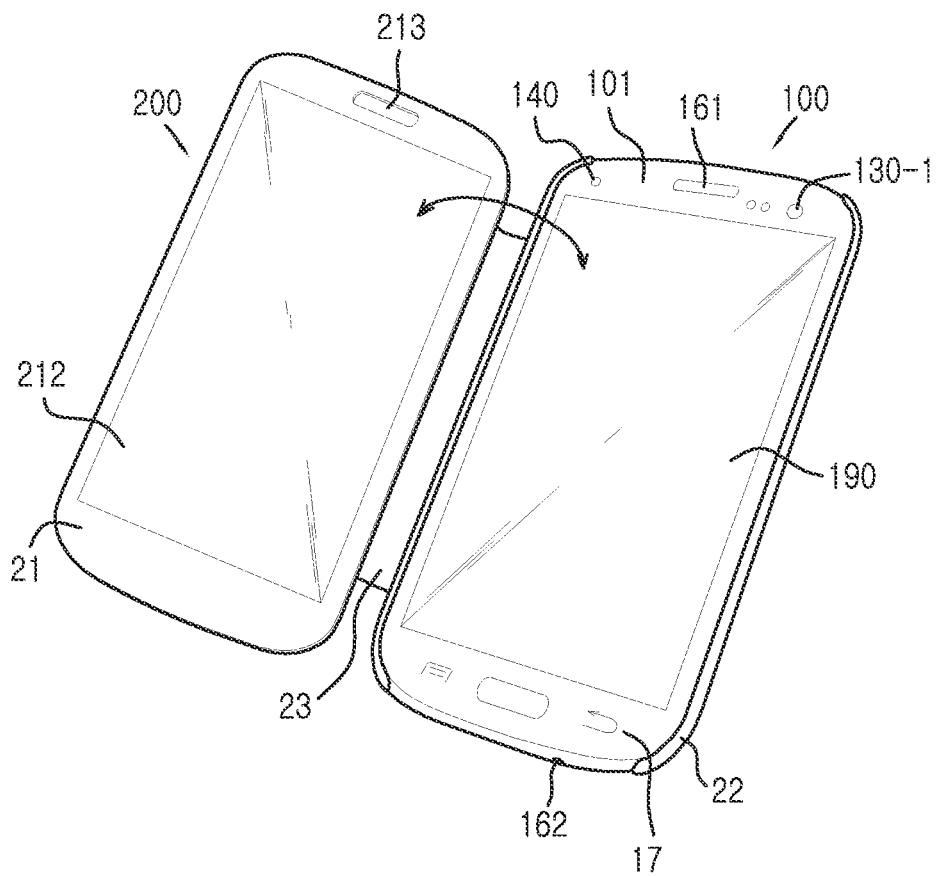
FIGS. 1 and 2 illustrate an electronic cover device coupled to an electronic device according to an embodiment of the present disclosure.
Figure 2:
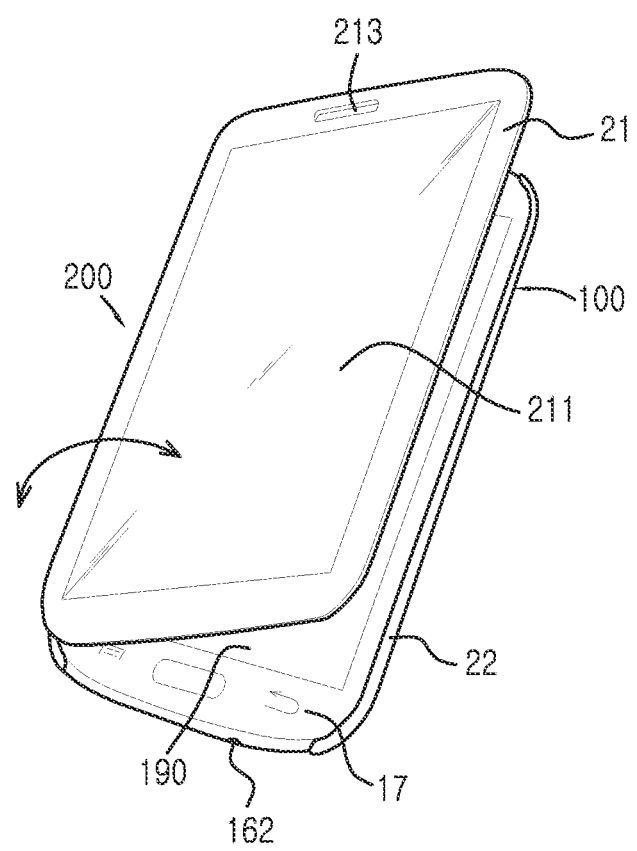

FIGS. 1 and 2 illustrate an electronic cover device coupled to an electronic device according to an embodiment of the present disclosure.

Referring to FIGS. 1 and 2, an electronic device 100 may include a speaker 161 for outputting a sound, a touch screen 190 for displaying an image and receiving a touch input, a microphone 162 for receiving the sound, a keypad 17 including input buttons, a front camera 130-1 and a rear camera 130-2 (FIG. 3) for capturing an image, and a sensor 140 for detecting proximity and measuring temperature, but is not limited thereto.

An electronic cover device 200 may include a first cover 21, a second cover 22, and a connector 23. The connector 23 interconnects the first cover 21 and the second cover 22. The second cover 22 is coupled to the electronic device 100. The first cover 21 rotates to cover or open a front side 101 of the electronic device 100. The touch screen 190 is disposed in the front side 101 of the electronic device 100. The first cover 21 of the electronic cover device 200 is closed, the touch screen 190 is hidden and unavailable. By contrast, the first cover 21 of the electronic cover device 200 is opened, the touch screen 190 is exposed and available.

The second cover 22 of the electronic cover device 200 is coupled to the electronic device 100 to electrically contact and communicate with each other.

The first cover 21 of the electronic cover device 200 is formed in a plate shape and in a size for at least covering the front side 101 of the electronic device 100. The first cover 21 of the electronic cover device 200 includes a front (outer) input/output device 211 disposed at the front and a rear (inner) input/output device 212 disposed at the back. Hereafter, the input/output device can fulfill either or both of the input and the output.

When the first cover 21 of the electronic cover device 200 is closed, the rear input/output device 212 of the first cover 21 contacts the touch screen 190 of the electronic device 100. The first cover 21 of the electronic cover device 200 includes an opening 213. When the first cover 21 is closed, a sound output from the speaker 161 of the electronic device 100 can be emitted to the outside through the opening 213 of the first cover 21.

The electronic cover device 200 may be flexible, and accordingly the outer display 211 and the inner display 212 of the first cover 21 can employ a flexible display.

The connector 23 of the electronic cover device 200 allows the first cover 21 to rotate from the second cover 22, and electrically connects the first cover 21 and the second cover 22. The connector 23 includes a Flexible Printed Circuit Board (FPCB). Thus, the connector 23 can electrically connect the first cover 21 and the second cover 22, and the FPCB can prevent fatigue of the connector 23 due to the repeated rotation of the first cover 21.

The electronic device 100 obtains information about the input/output device of the electronic cover device 200, fetches and sets a user setting from a memory. For example, the electronic device 100 selects the input/output device of the first cover 21 of the electronic cover device 200 according to a content type (e.g., video, photo, text, and the like), and controls the content input and output through the selected input/output device. The electronic device 100 selects the input/output device of the first cover 21 of the electronic cover device 200 according to an application (e.g., an e-book, an incoming message, and the like), and controls the content input and output for the application through the selected input/output device. The electronic device 100 determines, using the proximity sensor, whether the first cover 21 of the electronic cover device 200 is opened or closed, and thus, controls the content input and output.

A port in an inner side of the second cover 22 of the electronic cover device 200 electrically contacts the electronic device 100. The electronic cover device 200 is initialized after receiving power from the electronic device 100, and then sends an interrupt signal to the electronic device 100. The electronic device 100 receives the interrupt signal from the electronic cover device 200 and recognizes the electronic cover device 200, that is, couples to the electronic cover device 200. In other words, the electronic cover device 200 actively sends the interrupt signal to the electronic device 100, and the electronic device 100 is coupled to the electronic cover device 200 by receiving the interrupt signal from the electronic cover device 200.

Moreover, the electronic device 100 can recognize the electronic cover device 200 in various manners. For example, the electronic device 100 can recognize the electronic cover device 200 using pulling of periodic scan, but is not limited thereto. For example, the electronic device 100 periodically monitors a signal status. When the electronic cover device 200 is mounted, the signal status is changed and the electronic device 100 connects to the electronic cover device 200. For example, the electronic device 100 includes a physical switch for operating when the electronic cover device 200 is mounted. When the signal is changed according to the switch operation, the electronic device 100 determines that the electronic cover device 200 is mounted and thus, connects to the electronic cover device 200. For example, the electronic device 100 may determine that the electronic cover device 200 is mounted using a hall sensor or a proximity sensor, and couples to the electronic cover device 200.

The electronic device 100 may determine the type of the input/output devices of the mounted electronic cover device 200. The electronic device 100 may determine specifications of the input/output device of the mounted electronic cover device 200 using an interface signal (i.e., a control signal) with the mounted electronic cover device 200. The specifications of the input/output device of the electronic cover device 200 may include a display type, an input device type, an input/output device position, and the like. The display type may include an Electro Wetting Display (EWD), an E-paper, a Plasma Display Panel (PDP), a Liquid Crystal Display (LCD), an Organic LED (OLED), an Active Matrix OLED (AMOLED), and the like. The input device type may include a digitizer for a stylus pen, a capacitive overlay touch panel, a resistance overlay touch panel, a surface acoustic wave touch panel, an infrared beam touch panel, and the like. The input/output device position includes the front and the back of the first cover 21 of the electronic cover device 200.

Figure 3:
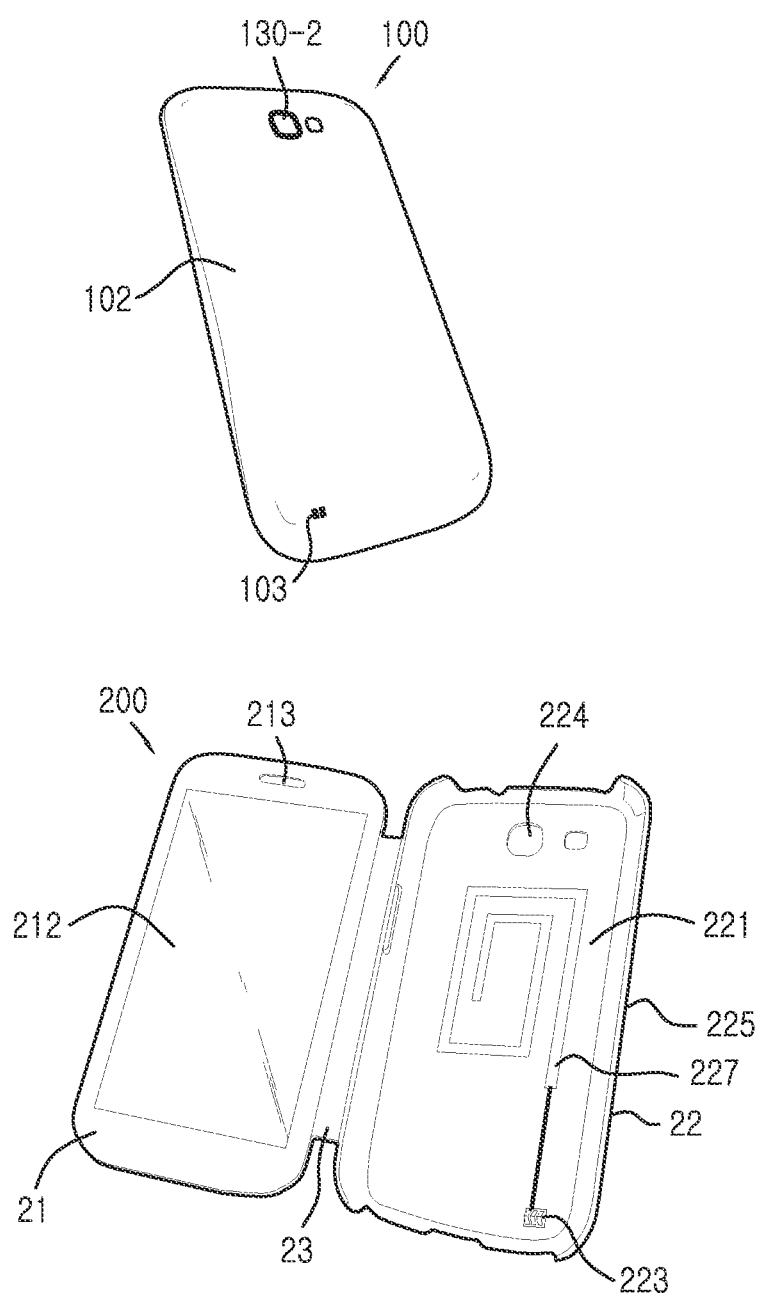
FIG. 3 illustrates an electronic cover device separated from an electronic device according to an embodiment of the present disclosure.

FIG. 3 illustrates an electronic cover device separated from an electronic device according to an embodiment of the present disclosure.

Referring to FIG. 3, the electronic device 100 may include a rear camera 130-2 disposed at the back 102 to capture an image. The electronic device 100 includes a port 103 at the back 102.

The second cover 22 of the electronic cover device 200 has an inner side 221 along the outline of the back exterior of the electronic device 100, and is fitted into the back exterior of the electronic device 100. When the electronic device 100 is fitted into the electronic cover device 200, the second cover 22 of the electronic cover device 200 is elastically bent and deformed. After the electronic device 100 is fitted, a rim 225 of the second cover 22 elastically presses and holds the electronic device 100. The second cover 22 of the electronic cover device 200 includes an opening 224. The opening 224 exposes the rear camera 130-2 of the mounted electronic device 100. The second cover 225 of the electronic cover device 200 may include a port 223. When the second cover 22 of the electronic cover device 200 is coupled to the electronic device 100, the port 223 of the electronic cover device 200 electrically contacts the port 103 of the electronic device 100. The port 223 of the electronic cover device 200 may be elastic to electrically contact the port 103 of the electronic device 100. A Near Field Communication (NFC) antenna 227 may be disposed inside the second cover 22 of the electronic cover device 200. A solar battery may be disposed in the outer side of the second cover 22 of the electronic cover device 200.

The port 223 of the electronic cover device 200 includes a power port, a ground port, an interrupt port, a control signal port, a display port, a touch panel port, a digitizer port, and the like. The electronic device 100 includes the port 103 corresponding to the port 223 of the electronic cover device 200. The electronic cover device 200 receives power from the electronic device 100 through the power port. The ground port of the electronic cover device 200 is electrically connected to a ground of at least one of the first cover 21, the second cover 22, and the connector 23, and the electronic cover device 200 is electrically connected to the ground of the electronic device 100 through the ground port. The electronic cover device 200 sends the interrupt signal to the electronic device 100 through the interrupt port, and the electronic device 100 recognizes the mounted electronic cover device 200 based on the interrupt signal received from the electronic cover device 200.

The electronic device 100 exchanges the control signal with the electronic cover device 200 through the control signal port, determines the specifications of the input/output device of the electronic cover device 200, fetches and sets the user setting from the memory according to the specifications of the input/output device of the electronic cover device 200. The electronic cover device 200 receives a video signal from the electronic device 100 through the display port and displays the video signal on the corresponding display. The electronic cover device 200 sends a touch signal generated by the touch panel to the electronic device 100 through the touch panel port, and the electronic device 100 receives and processes the touch signal from the electronic cover device 200. The electronic cover device 200 sends a touch signal generated by the digitizer to the electronic device 100 through the digitizer port, and the electronic device 100 receives and processes the touch signal from the electronic cover device 200.

The NFC antenna 227 of the electronic cover device 200 is electrically connected to a main board of the electronic device 100 through the port 223, and the main board of the electronic device 100 conducts NFC using the NFC antenna 227 of the electronic cover device 200. The solar battery of the electronic cover device 200 is electrically connected to the main board of the electronic device 100 through the port 227, and the main board of the electronic device 100 receives power from the solar battery of the electronic cover device 200 and charges its battery.

FIGS. 4A, 4B, and 4C illustrate various specifications of an input/output device of an electronic cover device according to an embodiment of the present disclosure.

Referring to FIG. 4A, the electronic cover device may include the displays in the outer side and the inner side, and may further include a touch input means (i.e., a touch panel, a digitizer, and the like). In the first example, the outer input/output device 211 includes an e-ink, a touch panel, and a digitizer, and the inner input/output device 212 includes a color display, a touch panel, and a digitizer. In the second example, the outer input/output device 211 includes the e-ink and the digitizer, and the inner input/output device 212 includes the color display, the touch panel, and the digitizer. In the third example, the outer input/output device 211 includes the e-ink and the touch panel, and the inner input/output device 212 includes the color display and the touch panel. In the fourth example, the outer input/output device 211 includes the e-ink, and the inner input/output device 212 includes the color display and the touch panel.

Referring to FIG. 4B, the electronic cover device may include the display in either the outer side or the inner side. In the first example, the electronic cover device includes the inner input/output device 212, and the inner input/output device 212 includes the color display, the touch panel, and the digitizer. In the second example, the electronic cover device includes the inner input/output device 212, and the inner input/output device 212 includes the color display and the touch panel. In the third example, the electronic cover device includes the outer input/output device 211, and the outer input/output device 211 includes the e-ink, the touch panel, and the digitizer. In the fourth example, the electronic cover device includes the outer input/output device 211, and the outer input/output device 211 includes the e-ink and the digitizer.

Referring to FIG. 4C, the first cover 21 of the electronic cover device may include a transparent all-in-one input/output device. In the first example, the electronic cover device includes the e-ink and the touch panel. In the second example, the electronic cover device includes the e-ink. In the third example, the electronic cover device includes the color display and the touch panel.

Figure 5:
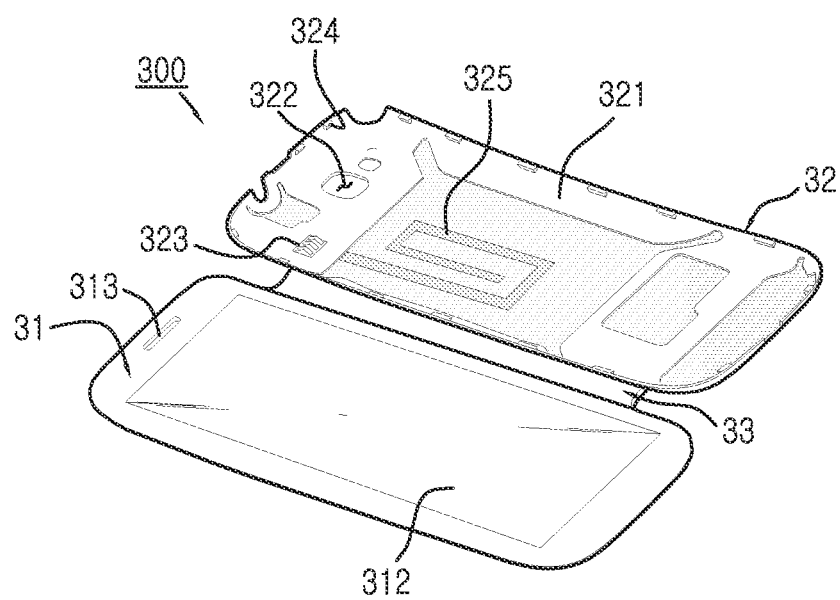
FIG. 5 illustrates an electronic cover device according to an embodiment of the present disclosure.

FIG. 5 illustrates an electronic cover device according to an embodiment of the present disclosure.

The electronic device 100 may include a housing which forms the exterior, and electronic components are received in a space of the housing. The housing includes a front housing, a rear housing, and an electronic cover device 300. The front housing and the rear housing are coupled to make the space for receiving the internal components, such as a main board, a touch screen, a speaker, a microphone, and the like. The touch screen 190 is disposed on the main board and includes a window and a display. The electronic cover device 300 and the rear housing are coupled to make the space for receiving at least one of a Subscriber Identity Module (SIM) card, a memory card, the battery, and the like.

Referring to FIG. 5, the electronic cover device 300 may include a first cover 31, a second cover 32, and a connector 33. The connector 33 interconnects the first cover 31 and the second cover 32. The second cover 32 of the electronic cover device 300 is coupled to the rear housing of the electronic device 100. The first cover 31 of the electronic cover device 300 rotates to cover or open the front side of the electronic device 100. The second cover 32 of the electronic cover device 300 can be coupled to or separated from the rear housing. The second cover 32 of the electronic cover device 300 includes a snap fit 324 disposed at the rim, and the rear housing includes a coupling groove 321 at an adequate position corresponding to the snap fit 324 of the electronic cover device 300. When the rear housing is coupled to the second cover 32 of the electronic cover device 300, the snap fit 324 is fitted into the coupling groove 321. When the second cover 32 of the electronic cover device 300 is fastened to or separated from the rear housing, the second cover 32 of the electronic cover device 300 is elastically bent and deformed. The electronic cover device 300 includes an opening 322 for exposing the rear camera 130-2 which is received in the front housing and the rear housing. An NFC antenna 325 is disposed in the inner side of the second cover 32 of the electronic cover device 300. A solar battery can be disposed in the outer side of the second cover 32 of the electronic cover device 300.

The first cover 31 of the electronic cover device 300 is formed in a plate shape and in a size for covering the front side of the electronic device 100. The first cover 31 of the electronic cover device 300 includes a front (outer) input/output device (not shown) disposed at the front and a rear (inner) input/output device 312 disposed at the back. When the first cover 31 of the electronic cover device 300 is closed, the rear input/output device 312 of the first cover 31 contacts the touch screen 190 of the electronic device 100. The first cover 31 of the electronic cover device 300 includes an opening 313. When the first cover 31 is closed, the sound output from the speaker 161 of the electronic device 100 can be emitted to the outside through the opening 313 of the first cover 31.

The connector 33 of the electronic cover device 300 allows the first cover 31 to rotate from the second cover 32, and electrically connects the first cover 31 and the second cover 32. The connector 33 includes an FPCB. Thus, the connector 33 can electrically connect the first cover 31 and the second cover 32, and the FPCB can prevent the fatigue due to the repeated rotation of the first cover 21.

The second cover 32 of the electronic cover device 300 is coupled to the rear housing and electrically contacts the main board. The second cover 32 of the electronic cover device 300 includes a port 323 in its inner side, and the main board of the electronic device 100 includes the corresponding port. The electronic cover device 300 exchanges an interface signal with the electronic device 100 through the port 323. The electronic device 100 receives the interrupt signal from the electronic cover device 300 and recognizes the mounted electronic cover device 300. The electronic device 100 exchanges the control signal with the electronic cover device 300, determines the specifications of the input/output device of the electronic cover device 300, and fetches and sets the user setting from the memory according to the specifications of the input/output device of the electronic cover device 300. For example, the electronic device 100 selects the input/output device of the first cover 31 of the electronic cover device 300 according to the content type (e.g., a video, a photo, a text, and the like), and controls the content input and output through the selected input/output device. The electronic device 100 selects the input/output device of the first cover 31 of the electronic cover device 300 according to the application (e.g., an e-book, an incoming message, and the like), and controls the content input and output for the application through the selected input/output device. The electronic device 100 determines using the proximity sensor whether the first cover 31 of the electronic cover device 300 is opened or closed, and accordingly controls the content input and output.

The NFC antenna 325 of the electronic cover device 300 is electrically connected to the main board of the electronic device 100 through the port 323, and the main board of the electronic device 100 conducts the NFC using the NFC antenna 325 of the electronic cover device 300. The solar battery of the electronic cover device 300 is electrically connected to the main board of the electronic device 100 through the port 323, and the main board of the electronic device 100 receives power from the solar battery of the electronic cover device 300 and chargers its battery.

Figure 6:
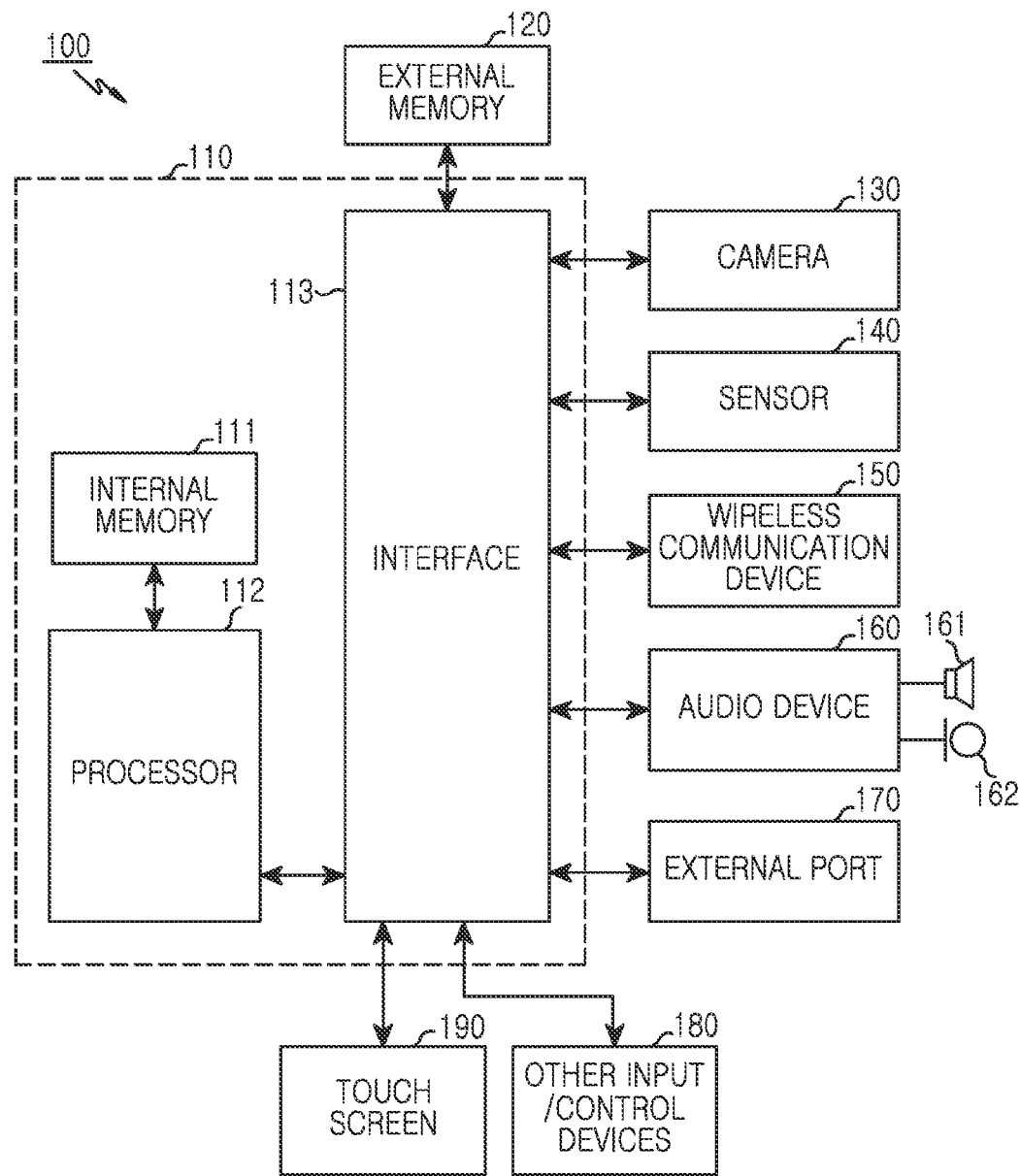
FIG. 6 is a block diagram of an electronic device according to an embodiment of the present disclosure.

FIG. 6 is a block diagram of an electronic device according to an embodiment of the present disclosure.

Referring to FIG. 6, the electronic device 100 may include a device, such as a mobile phone, a mobile pad, a media player, a tablet computer, a handheld computer, a Personal Digital Assistant (PDA), and the like. The electronic device 100 may include an electronic device combining two or more functions of them.

The electronic device 100 may include a host device 110, an external memory 120, a camera 130, a sensor 140, a wireless communication device 150, an audio device 160, an external port 170, a touch screen 190, other input/control devices 180, and the like. A plurality of external memories 120 and a plurality of external ports 170 may be included.

The host device 110 may include an internal memory 111, one or more processors 112, and an interface 113. The internal memory 111, the one or more processors 112, and the interface 113 can be embodied separately or integrated onto at least one integrated circuit.

The processor 112 performs various functions for the electronic device 100 by processing various software programs, and processes and controls voice communication, video communication, and data communication. In addition to those typical functions, the processor 112 processes a software module (i.e., an instruction set) stored in the internal memory 111 and/or the external memory 120 and performs various functions corresponding to the module. The processor 112 also processes a particular software module (i.e., an instruction set) stored in the internal memory 111 and/or the external memory 120 and performs particular functions corresponding to the module. For example, the processor 112 fulfills the method according to various embodiments of the present disclosure in association with the software modules stored in the internal memory 111 and/or the external memory 120.

The processor 112 may include one or more data processors, an image processor, a COder/DECoder (CODEC), and the like. Further, the electronic device 100 may separately include the data processor, the image processor, or the CODEC. More specifically, the processor 112 stores interfaces based on the type of the electronic cover device 200 or 300 connected through the external port 170 or the wireless communication device 150, determines the type of the connected electronic cover device 200 or 300 when the electronic cover device 200 or 300 is connected, and sets the interface for the type of the electronic cover device 200 or 300. The interface includes a device or software for facilitating interactions between the user and the system (that is, the electronic cover device and the electronic device) and/or the electronic cover device and the electronic devices.

The interface 113 interconnects various devices of the electronic device 100 with the host device 110.

The camera 130 can perform camera functions, such as photo and video clip recording, but is not limited thereto. The camera 130 may include a Charged Coupled Device (CCD) or a Complementary Metal-Oxide Semiconductor (CMOS). According to the camera module processed by the processor 112, the camera 130 can modify a hardware structure, for example, move a lens or adjust an F number of an iris.

The various components of the electronic device 100 can be coupled using one or more communication buses or stream lines.

The sensor 140 may include a motion sensor, an optical sensor, a temperature sensor, and the like, and allow various functions. For example, the motion sensor can detect the motion of the electronic device 100, and the optical sensor can detect the ambient light.

The wireless communication device 150 allows wireless communication and may include a radio frequency transmitter and receiver and an optical (e.g., an infrared light, and the like) transmitter and receiver. Depending on a communication network, the wireless communication device 150 can be designed to operate over one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, a Bluetooth network, and the like. The wireless communication device 150 supports a short-range wireless communication connection scheme, for example, at least one of Wi-Fi, WiFi Direct, NFC, Bluetooth, and the like, with the electronic cover device 200 or 300.

The audio device 160 is coupled to a speaker 161 and a microphone 162 to process audio input and output, such as voice recognition, voice reproduction, digital recording, telephone function, and the like. For example, the audio device 160 communicates with the user through the speaker 161 and the microphone 162. The audio device 160 receives a data signal from the host device 110, converts the received data signal to an electric signal, and outputs the converted electric signal through the speaker 161. The speaker 161 converts the electric signal into the audible frequency band. The microphone 162 converts a sound wave from the person or other sound sources to an electric signal. The audio device 160 receives the electric signal from the microphone 162, converts the received electric signal to the audio data signal, and sends the converted audio data signal to the host device 110. The audio device 160 may include an ear phone, a head phone, or a headset attachable and detachable to and from the electronic device 100.

The external port 170 can connect the electronic device 100 to other electronic device directly or indirectly via the network (e.g., the Internet, an intranet, a wireless LAN, and the like). The external port 170 includes the port 103 disposed at the back 102 of the electronic device 100. The electronic cover device 200 or 300 and the electronic device 100 are electrically connected through the external port 170.

The touch screen 190 provides an input/output interface between the electronic device 100 and the user. The touch screen 190 applies a touch detection technology, forwards a user's touch input to the host device 110, and shows visual information fed from the host device 110, for example, text, graphics, video, and the like, to the user.

The other input/control devices 180 may include up/down buttons for volume control and at least one of a push button, a rocker button, a rocker switch, a thumb wheel, a dial, a stick, a pointer, such as a stylus, and the like, which is given the corresponding function.

The external memory 120 may include a fast random access memory, such as one or more magnetic disc storage devices, and/or a non-volatile memory, one or more optical storage devices, and/or a flash memory (e.g., a NAND and a NOR). The external memory 120 stores software, and the software includes an operating system module, a communication module, a graphic module, a user interface module, a CODEC module, and one or more application modules. The term 'module' can be referred to as a set of instructions, an instruction set, or a program. More particularly, the external memory 120 stores the interfaces based on the type of the electronic cover device 200 or 300. The interface includes the device or the software for facilitating the interactions between the user and the system (that is, the electronic cover device and the electronic device) and/or the electronic cover device 200 or 300 and the electronic device 100.

The operating system module indicates an embedded operating system, such as WINDOWS, LINUX, Darwin, RTXC, UNIX, OS X, VxWorks, and the like, and includes various software components for controlling general system operations. The system operations include, e.g., memory management and control, storage hardware (device) control and management, power control and management, and the like. The operating system module processes normal communication between various hardware (devices) and software components (modules).

The communication module allows communication with other portable terminal, such as a computer, server, an electronic device, and the like, through the wireless communication device 150 or the external port 170.

The graphic module may include various software components for providing and displaying graphics on the touch screen 190. The term 'graphics' encompasses a text, a web page, an icon, a digital image, a video, an animation, and the like.

The user interface module may include various software components relating to a user interface. The user interface module is involved in the status change of the user interface and the condition of the user interface status change.

The CODEC module may include software components relating to video file encoding and decoding.

The camera module may include camera related software components allowing camera related processes and functions.

The application module may include a browser, an e-mail, an instant message, a word processing, keyboard emulation, an address book, a touch list, a widget, Digital Right Management (DRM), voice recognition, voice reproduction, a position determining function, a location based service, and the like.

The internal memory 111 and/or the external memory 120 can further include additional modules (instructions) besides the above-stated modules. The various functions of the electronic device 100 as stated above and to be explained, can be performed by hardware and/or software and/or their combination including one or more stream processing and/or Application Specific Integrated Circuits (ASICs).

When the interrupt signal is received from the electronic cover device through the external port 170, the processor 112 recognizes the coupled electronic cover device. The processor 112 exchanges the control signal with the electronic cover device through the external port 170, determines the specifications of the input/output device of the electronic cover device, and fetches and sets the corresponding user setting from the internal memory 111 and/or the external memory 120.

Figure 7:
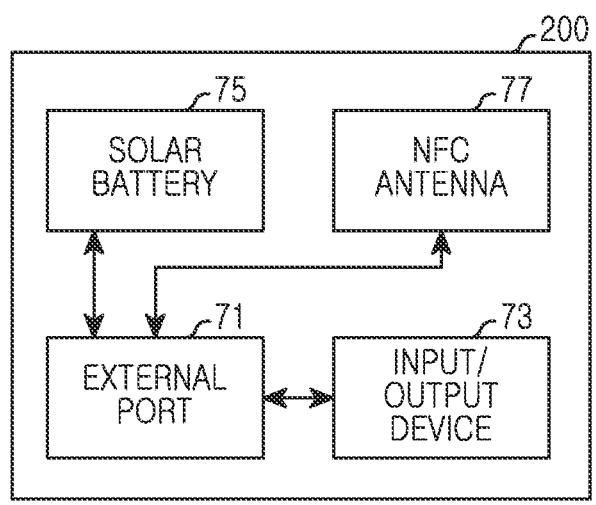
FIG. 7 is a block diagram of an electronic cover device according to an embodiment of the present disclosure.

FIG. 7 is a block diagram of an electronic cover device according to an embodiment of the present disclosure.

Referring to FIG. 7, the electronic cover device 200 may include an external port 71, an input/output device 73, a solar battery 75, and an NFC antenna 77.

The external port 71 connects the electronic cover device 200 to the electronic device 100. The external port 71 exchanges input/output signals with the electronic device 100. The external port 71 is connected to the solar battery 75 and to the NFC antenna 77. The solar battery 75 generates power from solar energy, and the external port 71 supplies the power generated by the solar battery 71 to a battery charger of the electronic device 100. The NFC antenna 77 is electrically connected to the electronic device 100 through the external port 71, and the wireless communication device 150 of the electronic device 100 can secure the NFC antenna from the electronic cover device 200. The external port 71 includes the port 223 of the electronic cover device 200. The port 223 of the external port 71 includes the power port, the ground port, the interrupt port, and the control signal port. The external port 71 includes the port for at least one unit of the input/output device 73, for example, the display port for the video signal with the display, the touch panel port for the touch signal with the touch panel, and the digitizer port for the touch signal with the digitizer.

The input/output device 73 displays the video signal from the electronic device 100 or sends the touch signal to the electronic device 100. The input/output device 73 can conform to the embodiments of FIGS. 4A, 4B, and 4C. The input/output device 73 may include an audio input/output device (e.g., a speaker, a microphone, and the like).

Figure 8A:
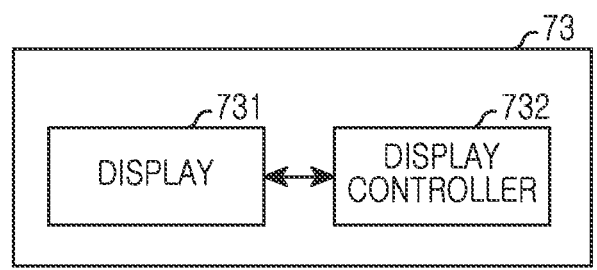
FIGS. 8A, 8B, and 8C are block diagrams of an input/output device according to an embodiment of the present disclosure.
Figure 8B:
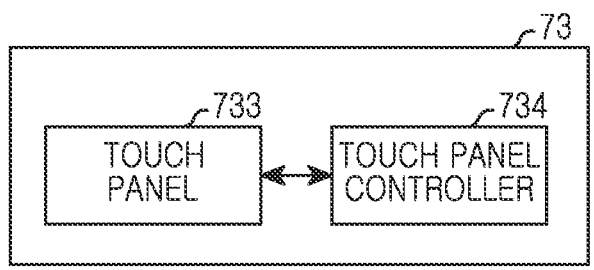
Figure 8C:
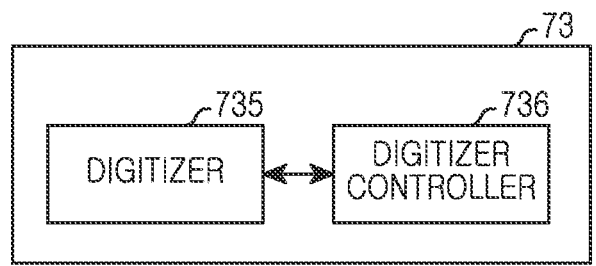

FIGS. 8A, 8B, and 8C are block diagrams of an input/output device according to an embodiment of the present disclosure.

Referring to FIG. 8A, the input/output device 73 may include a display 731 and a display controller 732. Under control of the display controller 732, the display 731 outputs the video signal fed from the electronic device 100. The display controller 732 controls the power and the signal of the display 731. The display 731 can employ one of an EWD, an E-paper, a PDP, an LCD, an OLED, an AMOLED, and the like.

Referring to FIG. 8B, the input/output device 73 may include a touch panel 733 and a touch panel controller 734. Under control of the touch panel controller 734, the touch panel 733 outputs the video signal fed from the electronic device 100 and sends the touch signal to the electronic device 100. The touch panel controller 734 controls the power and the signal of the touch panel 733. The touch panel controller 734 applies current fed from the electronic device 100 to the touch panel 733, locates the user touch on the touch panel 733, and sends the detected location to the electronic device 100. The touch panel 733 can employ the capacitive overlay touch panel, the resistance overlay touch panel, the surface acoustic wave touch panel, and the infrared beam touch panel.

Referring to FIG. 8C, the input/output device 73 may include a digitizer 735 and a digitizer controller 736. The digitizer controller 736 controls the power and the signal of the digitizer 735. The digitizer controller 736 supplies the current fed from the electronic device 100 to the digitizer 735, and the digitizer 735 generates an electromagnetic field. When the stylus pen approaches the electromagnetic field of the digitizer 735, the electromagnetic field is induced and the digitizer controller 736 locates the electromagnetic field and sends the detected location to the electronic device 100.

Referring to FIGS. 8B and 8C, the electronic cover device 200 includes, but not limited to, the input device 73 for receiving the user touch signal. The input device 73 of the electronic cover device 200 may employ a biometric sensor based on fingerprint reading, iris scanning, face recognition, and voice recognition. For example, the fingerprint reading sensor obtains image information of a fingerprint indicating unique characteristics of the person, and the electronic device 100 extracts the fingerprint characteristics from the raw fingerprint image obtained by the fingerprint reading sensor of the input device 73 of the electronic cover device 200 and identifies the authorized user by comparing and matching it with user characteristic information registered in a database. The fingerprint image can be acquired using various methods, such as an optical method, a semiconductor method for detecting capacitance or electrical conduction, an ultrasonic method, a heat detection method, a non-contact method, and the like, alone or in combination.

Figure 9:
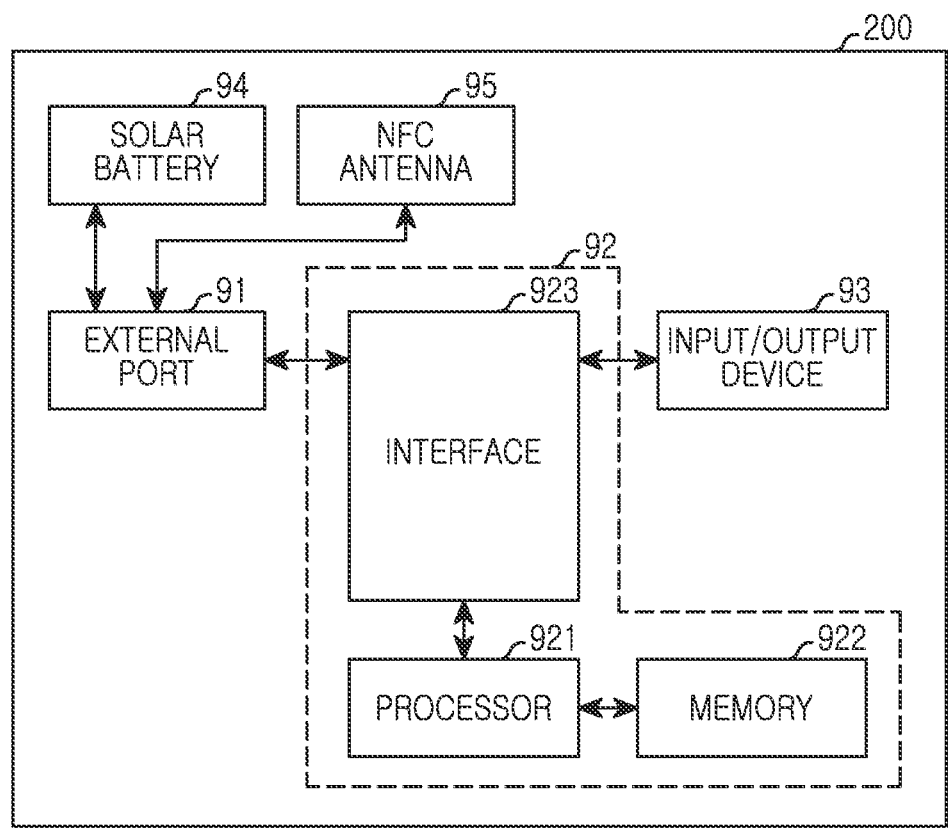
FIG. 9 is a block diagram of an electronic cover device according to an embodiment of the present disclosure.

FIG. 9 is a block diagram of an electronic cover device according to an embodiment of the present disclosure.

Referring to FIG. 9, the electronic cover device 200 may include an external port 91, a host device 92, an input/output device 93, a solar battery 94, and an NFC antenna 95.

The external port 91 connects the electronic cover device 200 to the electronic device 100. The external port 91 exchanges the input/output signals with the electronic device 100. The external port 91 is connected to the solar battery 94 and to the NFC antenna 95. The solar battery 94 generates power from the solar energy, and the external port 91 supplies the power generated by the solar battery 94 to the battery charger of the electronic device 100. The NFC antenna 95 is electrically connected to the electronic device 100 through the external port 91, and the wireless communication device 150 of the electronic device 100 can secure the NFC antenna from the electronic cover device 200. The external port 91 includes the port 223 of the electronic cover device 200. The port 223 of the external port 91 includes the power port, the ground port, the interrupt port, and the control signal port. As mentioned above, since the electronic cover device 200 includes the host device 92 for controlling the input/output device 93, the port 223 of the external port 91 can configure an integrated port for the units (e.g., a display, a touch panel, a digitizer, and the like) of the input/output device 93.

The host device 92 may include a processor 921, a memory 922, and an interface 923. The processor 921, the memory 922, and the interface 923 can be embodied separately or integrated onto at least one integrated circuit.

The processor 921 performs various functions by processing various software programs, and processes and controls the data communication. In addition to those typical functions, the processor 921 processes the software module (i.e., an instruction set) stored in the memory 923 and performs various functions corresponding to the module. The signal of the input/output device 93 of the electronic cover device 200 is processed in the communication between the processor 921 of the electronic cover device 200 and the processor 112 of the electronic device 100.

The interface 923 interconnects the devices of the electronic cover device 200 and the host device 92.

The input/output device 93 can conform to one of the embodiments of FIGS. 4A, 4B, and 4C, and include at least one type of FIGS. 8A, 8B, and 8C.

Figure 10:
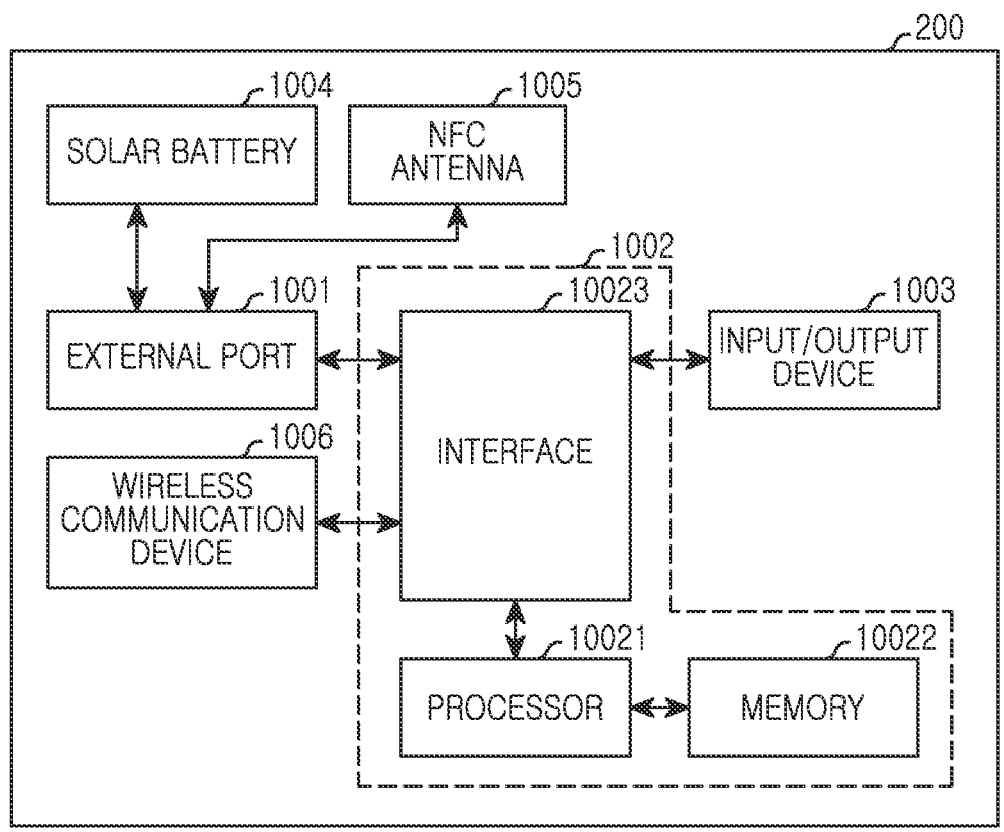
FIG. 10 is a block diagram of an electronic cover device according to an embodiment of the present disclosure.

FIG. 10 is a block diagram of an electronic cover device according to an embodiment of the present disclosure.

Referring to FIG. 10, the electronic cover device 200 may include an external port 1001, a host device 1002, an input/output device 1003, a solar battery 1004, an NFC antenna 1005, and a wireless communication device 1006.

The external port 1001 connects the electronic cover device 200 to the electronic device 100. The external port 1001 exchanges the input/output signals with the electronic device 100. The external port 1001 is connected to the solar battery 1004 and to the NFC antenna 1005. The solar battery 1004 generates power from the solar energy, and the external port 1001 supplies the power generated by the solar battery 1004 to the battery charger of the electronic device 100. The NFC antenna 1005 is electrically connected to the electronic device 100 through the external port 1001, and the wireless communication device 1006 of the electronic device 100 can secure the NFC antenna from the electronic cover device 200. The external port 1001 includes the port 223 of the electronic cover device 200. The port 223 of the external port 1001 includes the power port, the ground port, and the interrupt port. As mentioned above, since the electronic cover device 200 includes the host device 1002 for controlling the input/output device 1003 and the wireless communication device 1006 for the wireless communication with the electronic device 100, the port 223 of the external port 1001 may not need the port for the control signal and the input/output data of the units (e.g., a display, a touch panel, a digitizer, and the like) of the input/output device 1003.

The host device 1002 may include a processor 10021, a memory 10022, and an interface 10023. The processor 10021, the memory 10022, and the interface 10023 can be embodied separately or integrated onto at least one integrated circuit.

The processor 10021 performs various functions by processing various software programs, and processes and controls the data communication. In addition to those typical functions, the processor 10021 processes the software module (i.e., an instruction set) stored in the memory 10023 and performs various functions corresponding to the module. The signal of the input/output device 1003 of the electronic cover device 200 is processed in the communication between the processor 10021 of the electronic cover device 200 and the processor 112 of the electronic device 100.

The interface 10023 interconnects the devices of the electronic cover device 200 and the host device 1002.

The input/output device 1003 can conform to one of the embodiments of FIGS. 4A, 4B, and 4C, and include at least one type of FIGS. 8A, 8B, and 8C.

The wireless communication device 1006 allows the wireless communication and may include a radio frequency transmitter and receiver and an optical (e.g., an infrared light, and the like) transmitter and receiver. The wireless communication device 1006 of the electronic cover device 200 and the wireless communication device 150 of the electronic device 100 perform the short-range wireless communication, such as Wi-Fi, WiFi Direct, NFC, Bluetooth, and the like. The electronic cover device 200 is not limited to the communication with the electronic device 100 using the external port 1001, and also may communicate with the electronic device 100 using the wireless communication device 1006.

Figure 11A:
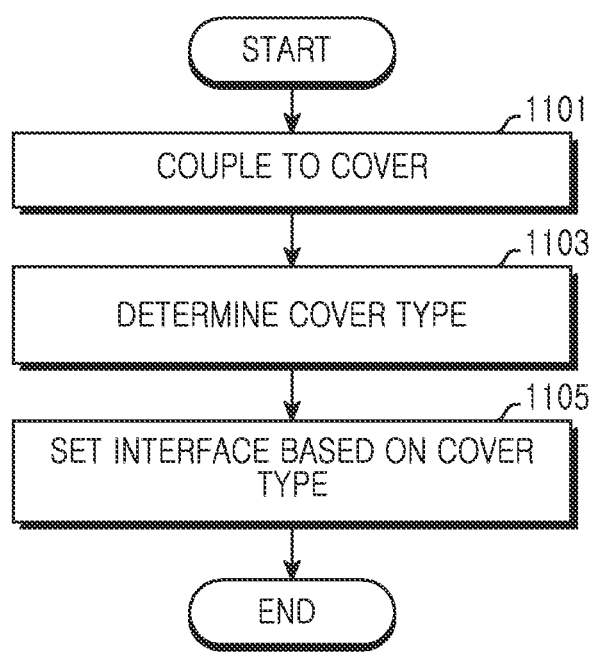
FIG. 11A is a flowchart of a method for connecting an electronic cover device in an electronic cover device according to an embodiment of the present disclosure.

FIG. 11A is a flowchart of a method for connecting an electronic cover device in an electronic cover device according to an embodiment of the present disclosure.

Referring to FIG. 11, in operation 1101, the processor 112 is coupled to the electronic cover device. The port 223 in the inner side of the second cover 22 of the electronic cover device electrically contacts the electronic device 100, and the electronic cover device is initialized after receiving power from the electronic device 100 and then sends the interrupt signal to the electronic device 100. The electronic device 100 receives the interrupt signal from the electronic cover device and recognizes the electronic cover device, that is, couples to the electronic cover device.

Moreover, the electronic device 100 can recognize the mounted electronic cover device in various manners. For example, the electronic device 100 can recognize the electronic cover device using the pulling of the periodic scan. For example, the electronic device 100 periodically monitors the signal status. When the electronic cover device is mounted, the signal status is changed and the electronic device 100 is coupled to the electronic cover device. For example, the electronic device 100 includes the physical switch for operating when the electronic cover device 200 is mounted. When the signal is changed according to the switch operation, the electronic device 100 determines that the electronic cover device is mounted and thus, couples to the electronic cover device. For example, the electronic device 100 determines that the electronic cover device is mounted using the hall sensor or the proximity sensor, and couples to the electronic cover device.

In operation 1103, the processor 112 determines the type of the coupled electronic cover device. In operation 1105, the processor 112 sets the interface based on the determined type of the electronic cover device.

Figure 11B:
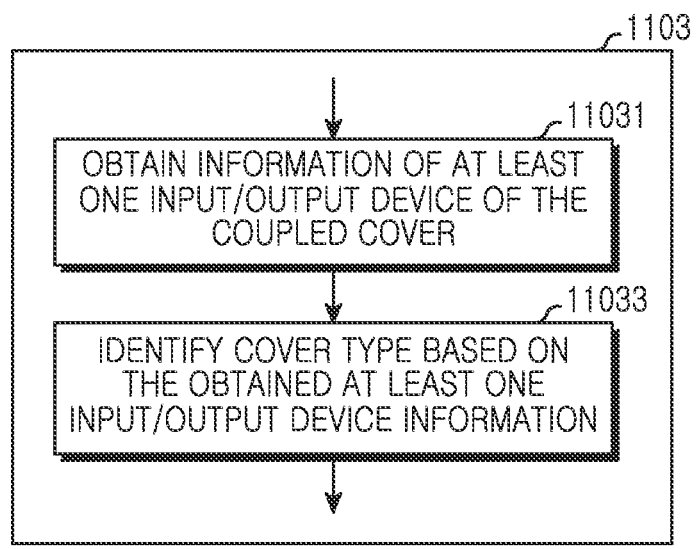
FIG. 11B is a flowchart of a method for determining a type of an electronic cover device according to an embodiment of the present disclosure.

FIG. 11B is a flowchart of a method for determining a type of an electronic cover device according to an embodiment of the present disclosure.

Referring to FIG. 11B, in determining the type of the coupled electronic cover device in operation 1103 of FIG. 11A, the processor 112 obtains in operation 11031 the information of at least one input/output device of the coupled electronic cover device. In operation 11033, the processor 112 identifies the type of the electronic cover device from the obtained information of the at least one input/output device. The electronic cover device sends the at least one input/output device information to the electronic device 100. The input/output device information may include the type of the display, the type of the input device, and the position of the input/output device. The display type may include an EWD, an E-paper, a PDP, an LCD, an OLED, an AMOLED, and the like. The input device type may include the digitizer for the stylus pen, the capacitive overlay touch panel, the resistance overlay touch panel, the surface acoustic wave touch panel, and the infrared beam touch panel. The input/output device position may include the front and the back of the first cover 21 of the electronic cover device.

The internal memory 111 or the external memory 120 stores the interfaces based on the type of the electronic cover device. The processor 112 loads and sets the interface for the type of the coupled electronic cover device from the internal memory 111 or the external memory 120. The interface includes the device or the software for facilitating the interactions between the user and the system (that is, the electronic cover device and the electronic device) and/or the electronic cover device and the electronic devices. For example, the processor 112 selects the input/output device of the first cover 21 according to the content type (e.g., video, photo, text, and the like), and controls the content input and output through the selected input/output device. The processor 112 selects the input/output device of the first cover 21 according to the application (e.g., an e-book, an incoming message, and the like), and controls the content input and output for the application through the selected input/output device. The processor 112 determines whether the first cover 21 is opened or closed using the proximity sensor and thus, controls the content input and output. The processor 112 selects the input/output device of the first cover 21 for the motion of the electronic device 100 and controls the content input and output through the selected input/output device.

Figure 12A:
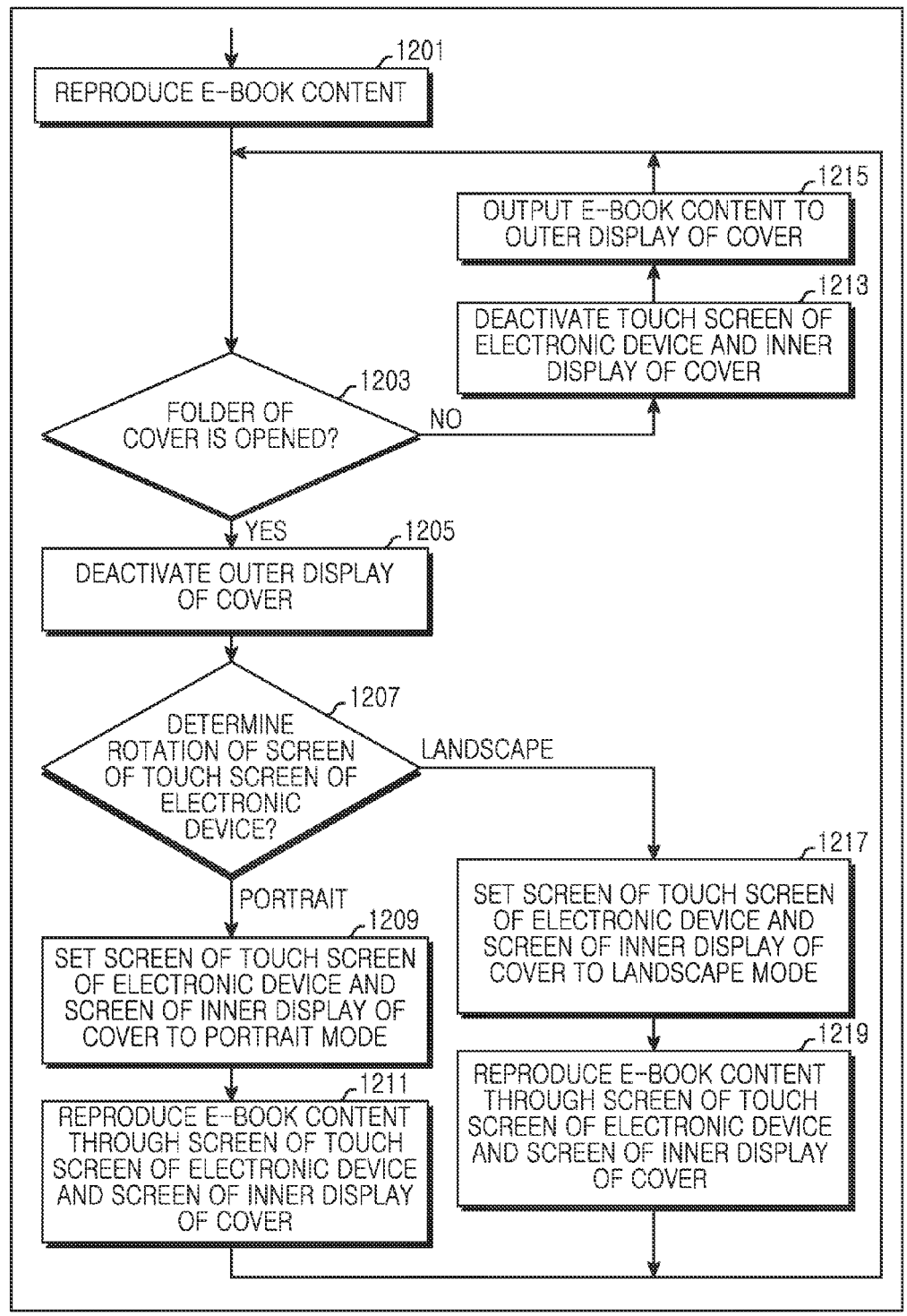
FIG. 12A is a flowchart of a method for outputting an e-book content in an electronic device and an electronic cover device according to an embodiment of the present disclosure.

FIG. 12A is a flowchart of a method for outputting an e-book content in an electronic device and an electronic cover device according to an embodiment of the present disclosure. The electronic cover device is assumed to include the outer display 211 and the inner display 212 in the first cover 21.

Referring to FIG. 12A, in operation 1201, the processor 112 reproduces the e-book content.

In operation 1203, the processor 112 determines whether the first cover 21 of the electronic cover device is opened.

When the first cover 21 of the electronic cover device is closed, the processor 112 goes to operation 1213. In operation 1213, the processor 112 deactivates the touch screen 190 of the electronic device 100 and the inner display 212 of the first cover 21 of the electronic cover device. In operation 1215, the processor 112 reproduces the e-book content through the outer display 211 of the first cover 21 of the electronic cover device. Thereafter, the processor 112 goes back to operation 1203.

By contrast, when the first cover 21 of the electronic cover device is opened, the processor 112 goes to operation 1205. In operation 1205, the processor 112 deactivates the outer display 211 of the first cover 21 of the electronic cover device.

In operation 1207, the processor 112 determines the rotation of the screen of the touch screen 190 of the electronic device 100. The processor 112 can detect the rotation of the electronic device 100 using the sensor 140, such as an accelerometer, a gyro sensor, geomagnetic sensor, and the like, and determine the rotation of the screen of the touch screen 190 of the electronic device 100 by analyzing the detected rotation. The processor 112 may detect the rotation of the electronic device 100 according to the orientation of the face captured by the camera 130 and determine the rotation of the screen of the touch screen 190 of the electronic device 100 by analyzing the detected rotation. Hence, the processor 112 can set the orientation of the screen of the touch screen 190 of the electronic device 100 to either a portrait mode or a landscape mode. The portrait mode sets the screen along the vertical axis with respect to a user's view, and the landscape mode sets the screen along the horizontal axis with respect the user's view.

When the screen of the touch screen 190 of the electronic device 100 is in the portrait mode, the processor 112 goes to operation 1209. In operation 1209, the processor 112 sets the screen of the touch screen 190 of the electronic device 100 and the screen of the inner display 212 of the first cover 21 of the electronic cover device to the portrait mode. In operation 1211, the processor 112 reproduces the e-book content through the screen of the touch screen 190 of the electronic device 100 and the screen of the inner display 212 of the first cover 21 of the electronic cover device in the portrait mode. Thereafter, the processor 112 returns to operation 1203.

When the screen of the touch screen 190 of the electronic device 100 is in the landscape mode, the processor 112 goes to operation 1217. In operation 1217, the processor 112 sets the screen of the touch screen 190 of the electronic device 100 and the screen of the inner display 212 of the first cover 21 of the electronic cover device to the landscape mode. In operation 1219, the processor 112 reproduces the e-book content through the screen of the touch screen 190 of the electronic device 100 and the screen of the inner display 212 of the first cover 21 of the electronic cover device in the landscape mode. Thereafter, the processor 112 returns to operation 1203.

Figure 12B:
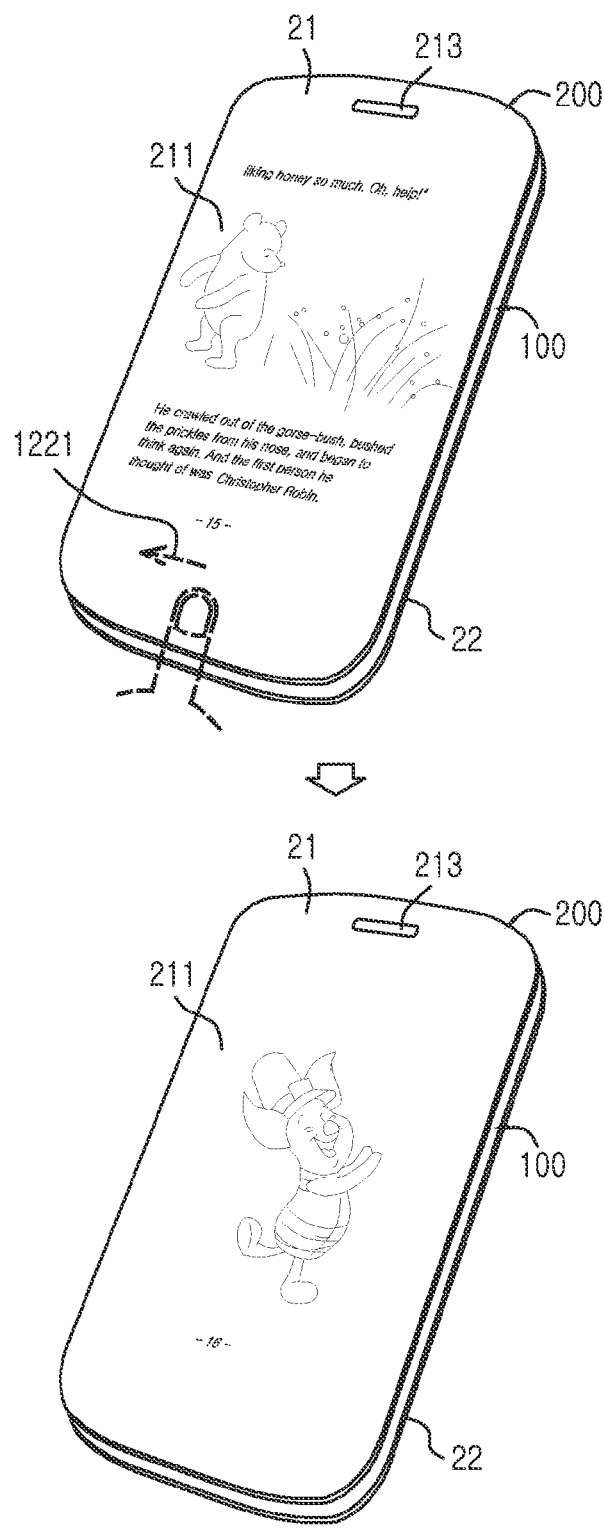
FIGS. 12B and 12C illustrate an e-book content output in an electronic device and an electronic cover device according to an embodiment of the present disclosure.
Figure 12C:
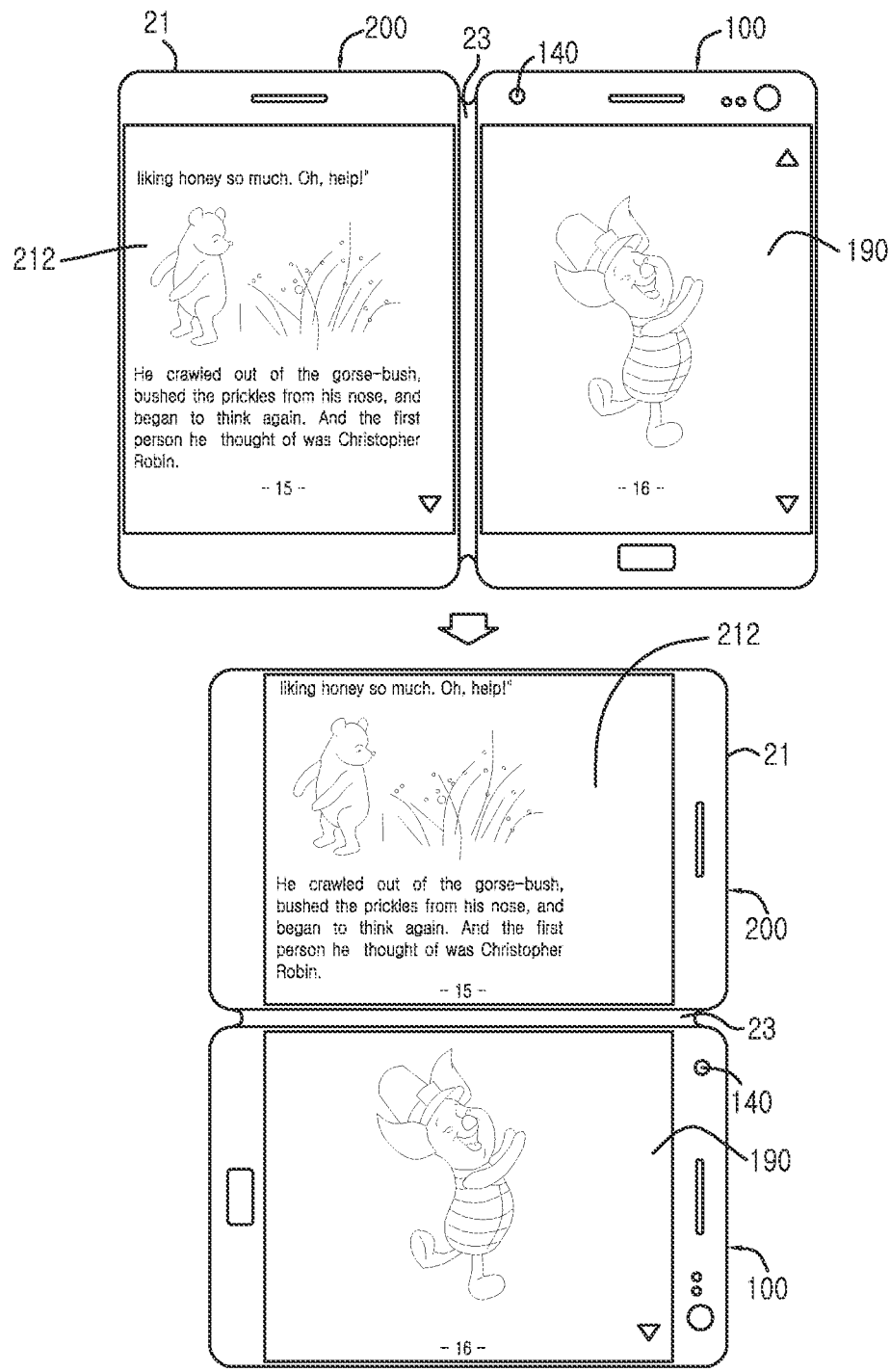

FIGS. 12B and 12C illustrate an e-book content output in an electronic device and an electronic cover device according to an embodiment of the present disclosure.

Referring to FIG. 12B, when the e-book content is reproduced and the first cover 21 of the electronic cover device covers the electronic device 100, the electronic device 100 deactivates the touch screen 190 and the inner display 212 of the first cover 21 of the electronic cover device and reproduces the e-book content through the outer display 211 of the first cover 21 of the electronic cover device. When the outer display 211 of the electronic cover device additionally includes a touch receiver, such as a touch panel or a digitizer, the current page is switched to a previous or next page according to a flicking touch event 1221. Herein, the outer display 211 of the electronic cover device can have a relatively low driving power and employ an EWD, an E-paper, and the like, capable of reproducing the e-book content.

Referring to FIG. 12C, when the e-book content is reproduced and the first cover 21 of the electronic cover device is opened, the electronic device 100 deactivates the outer display 211 of the electronic cover device and reproduces the e-book content through the touch screen 190 of the electronic device 100 and the inner display 212 of the electronic cover device. Herein, according to the orientation (e.g., landscape or portrait) of the screen of the touch screen 190, the electronic device 100 sets the screen of the touch screen 190 and the screen of the inner display 212 of the electronic cover device to the same screen mode (e.g., the portrait mode or the landscape mode).

FIGS. 13A, 13B, 13C, and 13D illustrate a screen for displaying a content list in an electronic device and an electronic cover device according to an embodiment of the present disclosure.

Figure 13A:
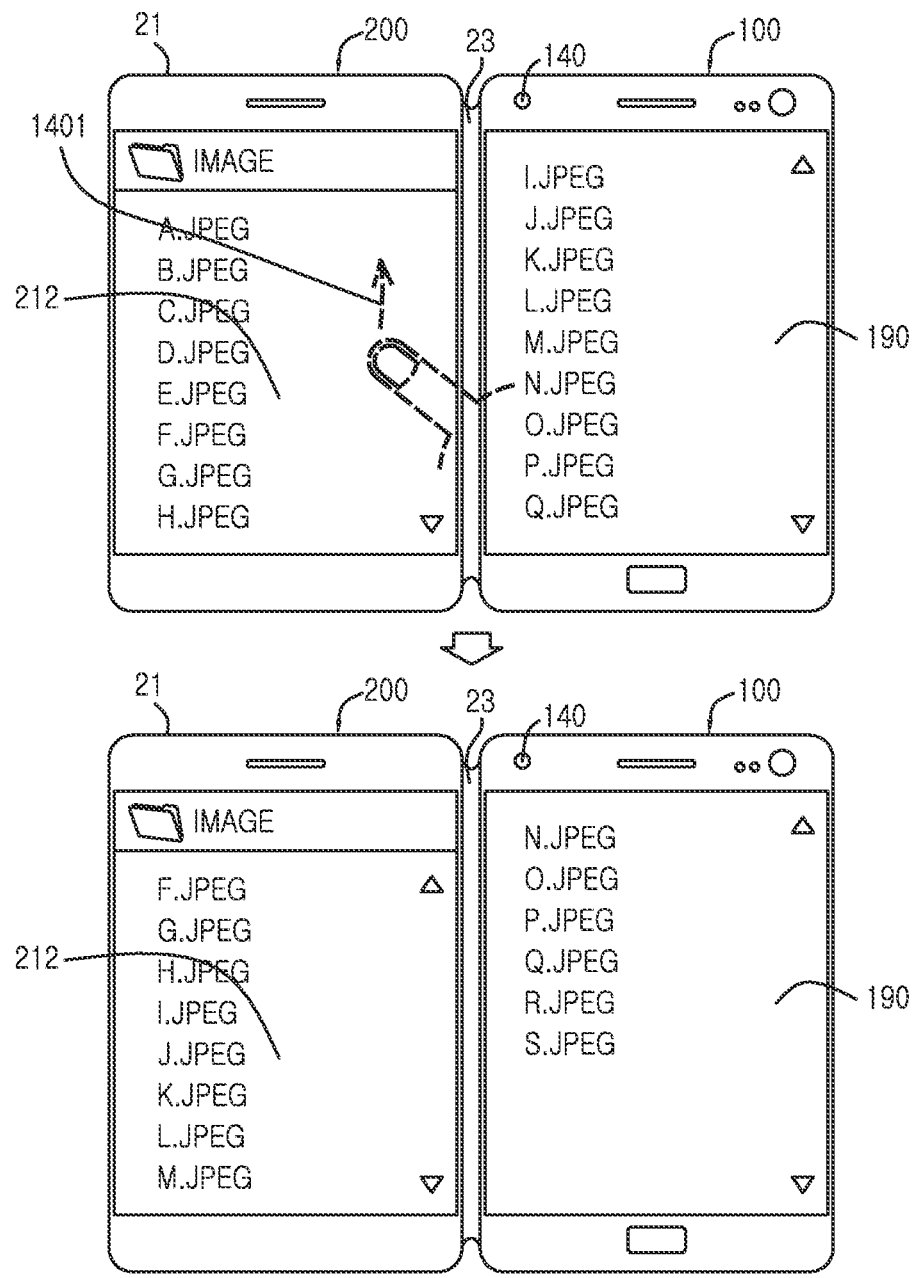
FIGS. 13A, 13B, 13C, and 13D illustrate a screen for displaying a content list in an electronic device and an electronic cover device according to an embodiment of the present disclosure.
Figure 13B:
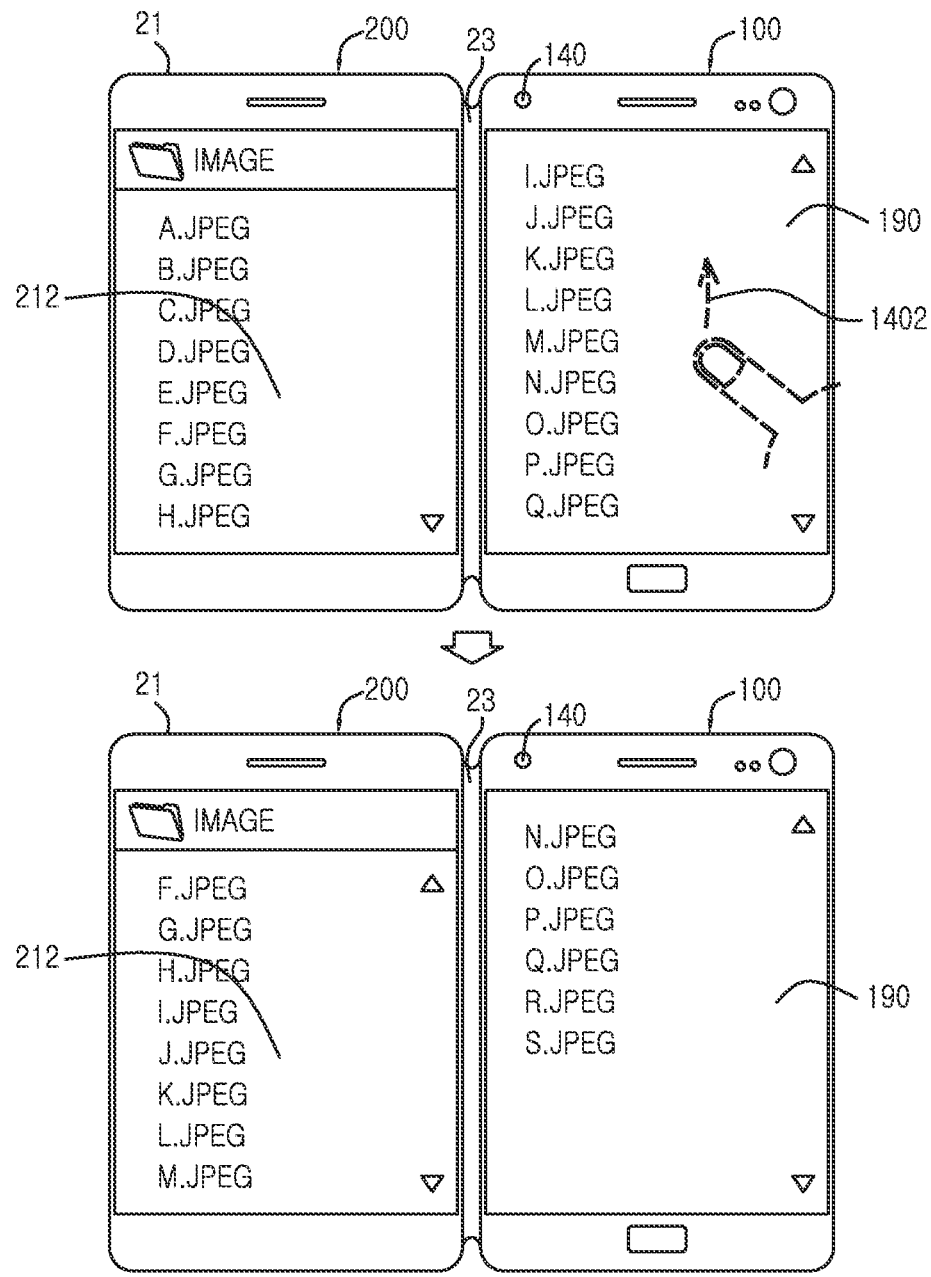

Referring to FIGS. 13A and 13B, the screen of the touch screen 190 of the electronic device 100 and the screen of the inner display 212 of the electronic cover device display the content list in the portrait mode. The content list continues from the portrait screen of the electronic cover device on the left to the portrait screen of the electronic device 100 on the right. When an upward flicking touch event 1401 is applied on the portrait screen of the electronic cover device, the content list is scrolled up on the portrait screen of the electronic cover device and the portrait screen of the electronic device 100. Similarly, when an upward flicking touch event 1402 is applied on the portrait screen of the electronic device 100, the content list is scrolled up on the portrait screen of the electronic cover device and the portrait screen of the electronic device 100. Although it is not depicted in FIGS. 13A and 13B, when the portrait screen of the electronic device 100 is on the left and the portrait screen of the electronic cover device is on the right, the content list continues from the portrait screen of the electronic device 100 on the left to the portrait screen of the electronic cover device.

Figure 13C:
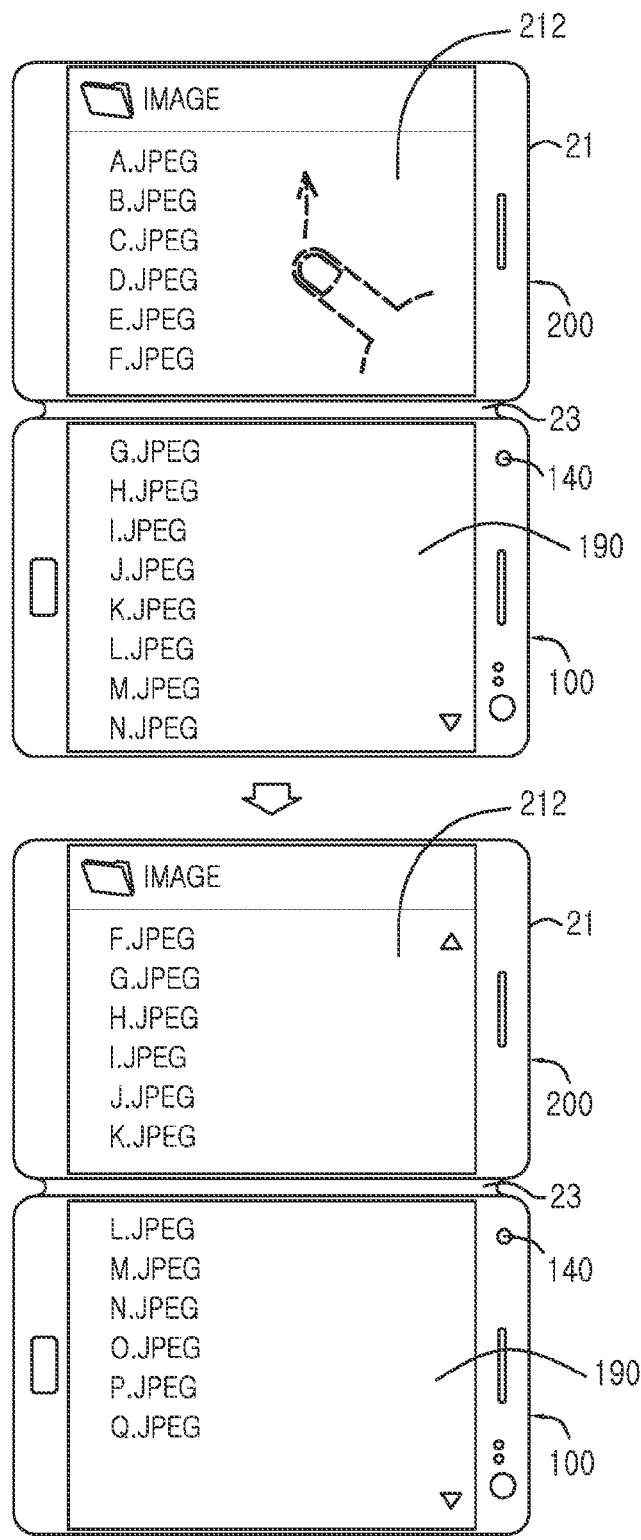
Figure 13D:
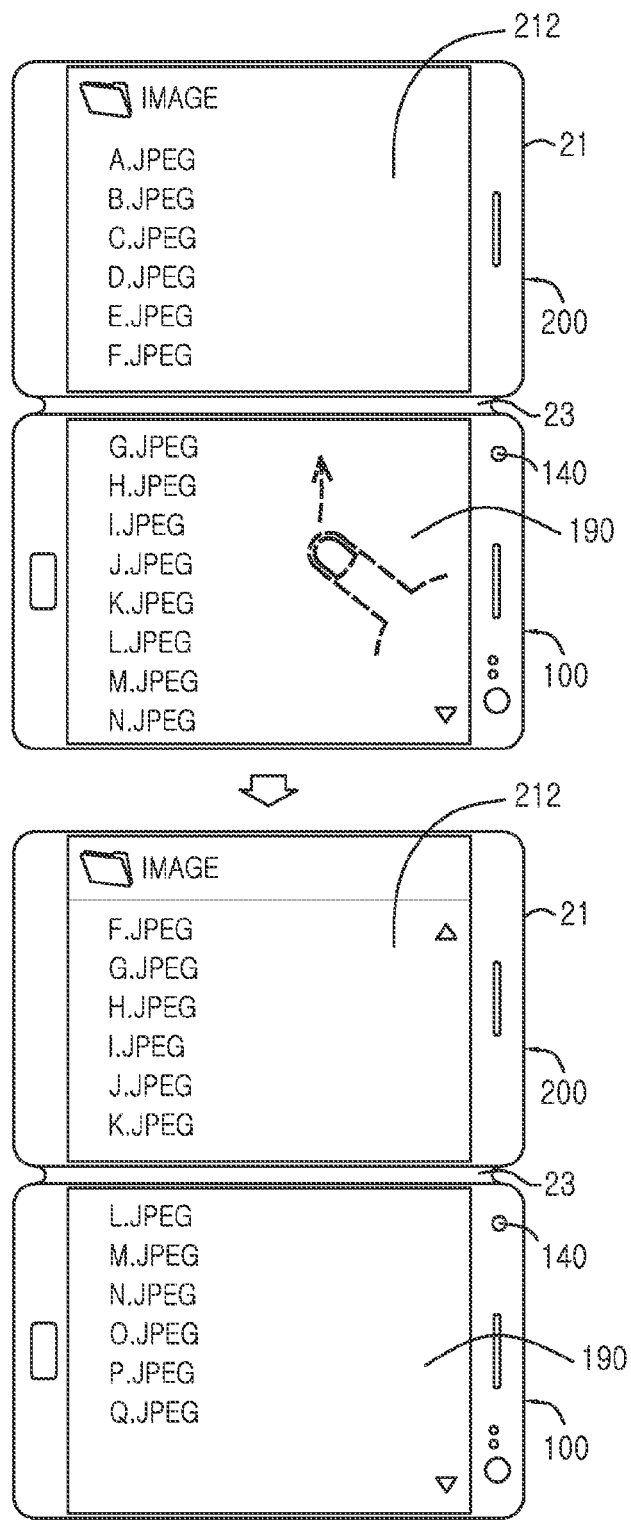

Referring to FIGS. 13C and 13D, the screen of the touch screen 190 of the electronic device 100 and the screen of the inner display 212 of the electronic cover device display the content list in the landscape mode. The content list continues from the landscape screen of the electronic cover device at the top to the landscape screen of the electronic device 100 at the bottom. When the upward flicking touch event 1401 is applied on the screen of the electronic cover device, the content list is scrolled up on the landscape screen of the electronic cover device and the landscape screen of the electronic device 100. Similarly, when the upward flicking touch event 1402 is applied on the landscape screen of the electronic device, the content list is scrolled up on the landscape screen of the electronic cover device and the landscape screen of the electronic device 100. Although it is not depicted in FIGS. 13C and 13D, when the landscape screen of the electronic device 100 is at the top and the landscape screen of the electronic cover device is at the bottom, the content list continues from the landscape screen of the electronic device 100 to the landscape screen of the electronic cover device.

Figure 14:
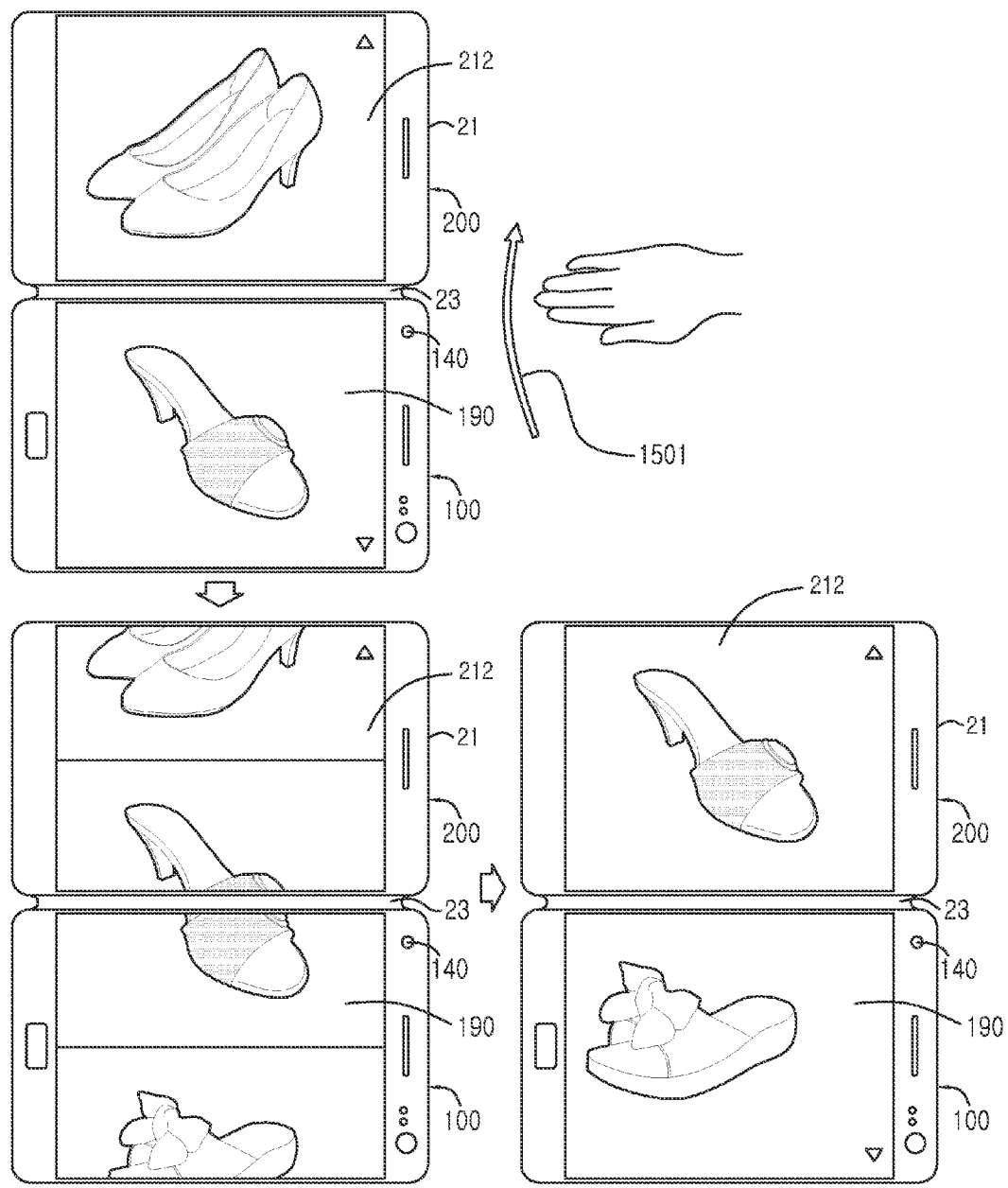
FIG. 14 illustrates a screen for displaying a content list in an electronic device and an electronic cover device according to an embodiment of the present disclosure.

FIG. 14 illustrates a screen for displaying a content list in an electronic device and an electronic cover device according to an embodiment of the present disclosure.

Referring to FIG. 14, the screen of the touch screen 190 of the electronic device 100 and the screen of the inner display 212 of the electronic cover device display the content list in the landscape mode. The content list continues from the landscape screen of the electronic cover device at the top to the landscape screen of the electronic device 100 at the bottom. When a gesture 1501 for moving the hand upward is applied to the screen of the electronic cover device, the content list is scrolled up on the landscape screen of the electronic cover device and the landscape screen of the electronic device 100. The sensor 140 of the electronic device 100 can detect the motion, and the electronic device 100 can recognize the scrolling gesture based on the motion information detected by the sensor 140.

Figure 15A:
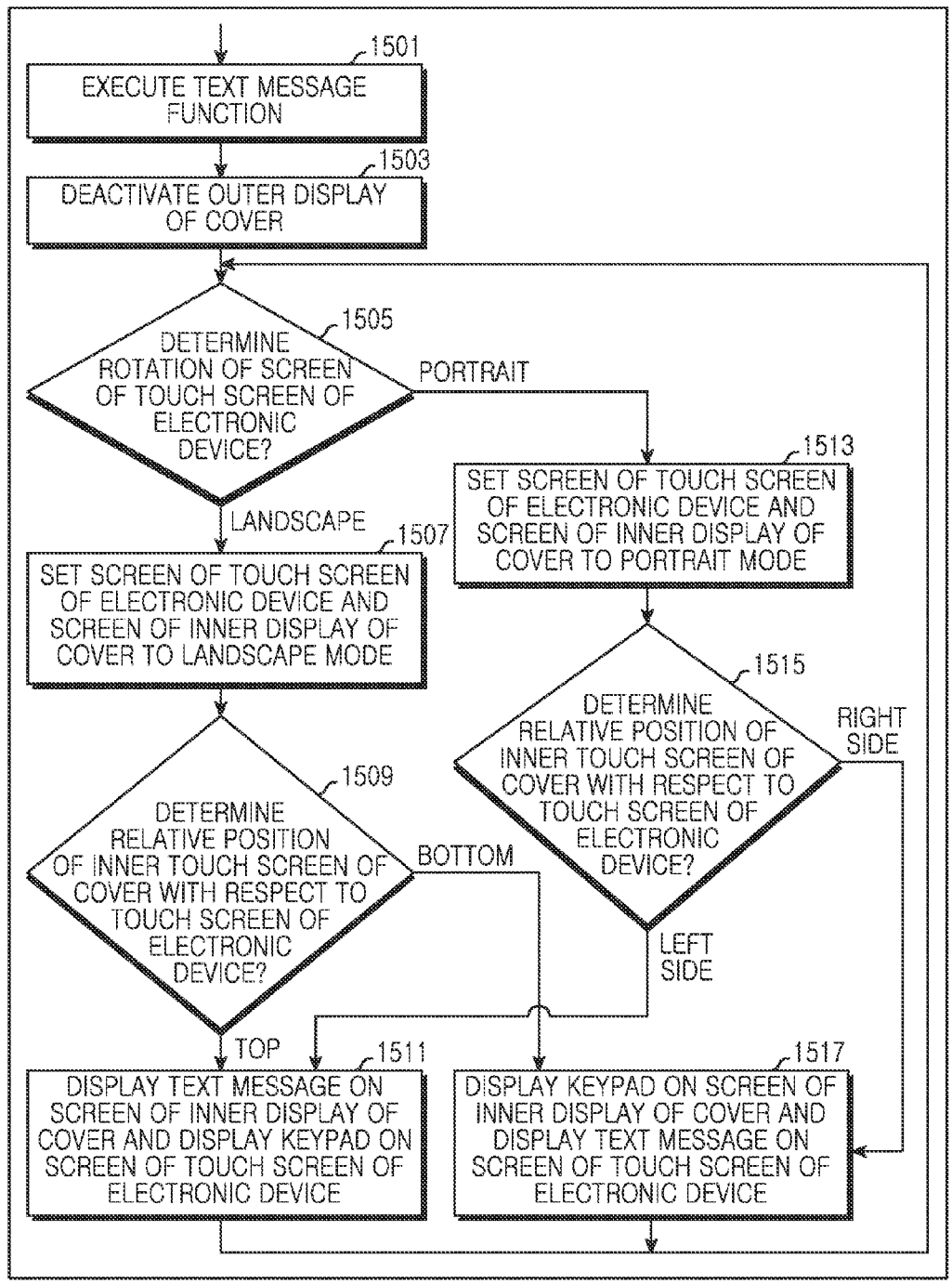
FIG. 15A illustrates a screen based on a text message function in an electronic device and an electronic cover device according to an embodiment of the present disclosure.

FIG. 15A illustrates a screen based on a text message function in an electronic device and an electronic cover device according to an embodiment of the present disclosure.

Referring to FIG. 15A, in operation 1501, the processor 112 processes the text message function. The text message function includes message transmission and message reception.

In operation 1503, the processor 112 deactivates the outer display of the electronic cover device.

In operation 1505, the processor 112 determines the rotation of the screen of the touch screen 190 of the electronic device 100. The processor 112 can detect the rotation of the electronic device 100 using the sensor 140, such as an accelerometer, a gyro sensor, a geomagnetic sensor, and the like, and determine the rotation of the screen of the touch screen 190 of the electronic device 100 by analyzing the detected rotation. The processor 112 may detect the rotation of the electronic device 100 according to the orientation of the face captured by the camera 130 and determine the rotation of the screen of the touch screen 190 of the electronic device 100 by analyzing the detected rotation. Hence, the processor 112 sets the orientation of the screen of the touch screen 190 of the electronic device 100 to either the portrait mode or the landscape mode. The portrait mode sets the screen along the vertical axis with respect to the user's view, and the landscape mode sets the screen along the horizontal axis with respect the user's view.

When the screen of the touch screen 190 of the electronic device 100 is in the landscape mode, the processor 112 goes to operation 1507. In operation 1507, the processor 112 sets the screen of the touch screen 190 of the electronic device 100 and the screen of the inner display 212 of the first cover 21 of the electronic cover device to the landscape mode. In operation 1509, the processor 112 determines a relative position of the inner touch screen 212 of the electronic cover device with respect to the touch screen 190 of the electronic device 100. Such determination can use the sensor 140. When the inner display 212 of the electronic cover device is above the touch screen 190 of the electronic device 100, the processor 112 displays the text message on the screen of the inner display 212 of the electronic cover device and displays a keypad on the screen of the touch screen 190 of the electronic device 100 in operation 1511. When the inner display 212 of the electronic cover device is below the touch screen 190 of the electronic device 100, the processor 112 displays the keypad on the screen of the inner display 212 of the electronic cover device and displays the text message on the screen of the touch screen 190 of the electronic device 100 in operation 1517. Thereafter, the processor 112 goes back to operation 1505.

When the screen of the touch screen 190 of the electronic device 100 is in the portrait mode, the processor 112 goes to operation 1513. In operation 1513, the processor 112 sets the screen of the touch screen 190 of the electronic device 100 and the screen of the inner display 212 of the first cover 21 of the electronic cover device to the portrait mode. In operation 1515, the processor 112 determines the relative position of the inner touch screen 212 of the electronic cover device with respect to the touch screen 190 of the electronic device 100. Such determination can use the sensor 140.

When the inner display 212 of the electronic cover device is on the left of the touch screen 190 of the electronic device 100, the processor 112 displays the text message on the screen of the inner display 212 of the electronic cover device and displays the keypad on the screen of the touch screen 190 of the electronic device 100 in operation 1511. When the inner display 212 of the electronic cover device is on the right of the touch screen 190 of the electronic device 100, the processor 112 displays the keypad on the screen of the inner display 212 of the electronic cover device and displays the text message on the screen of the touch screen 190 of the electronic device 100 in operation 1517. Thereafter, the processor 112 goes back to operation 1505.

Figure 15B:
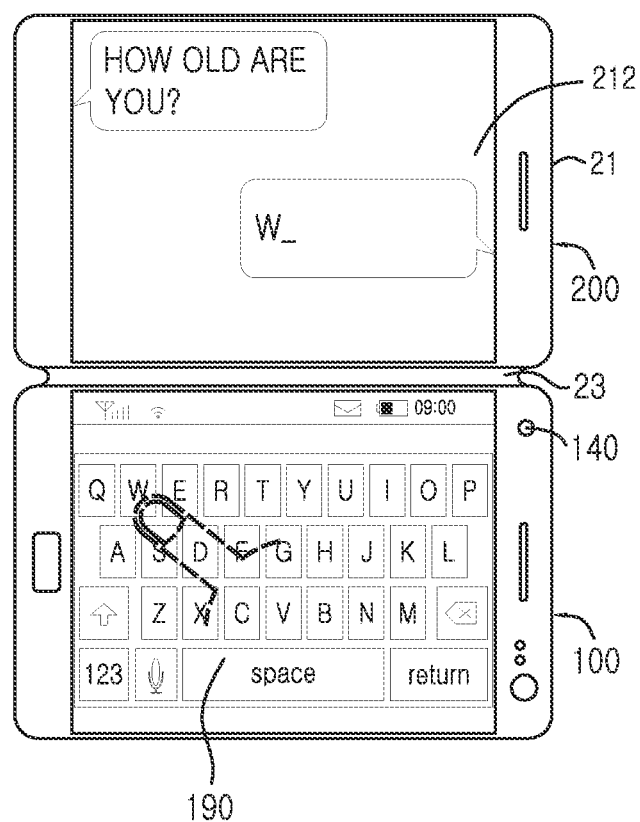
FIGS. 15B and 15C illustrate a screen based on a text message function in an electronic device and an electronic cover device according to an embodiment of the present disclosure.
Figure 15C:
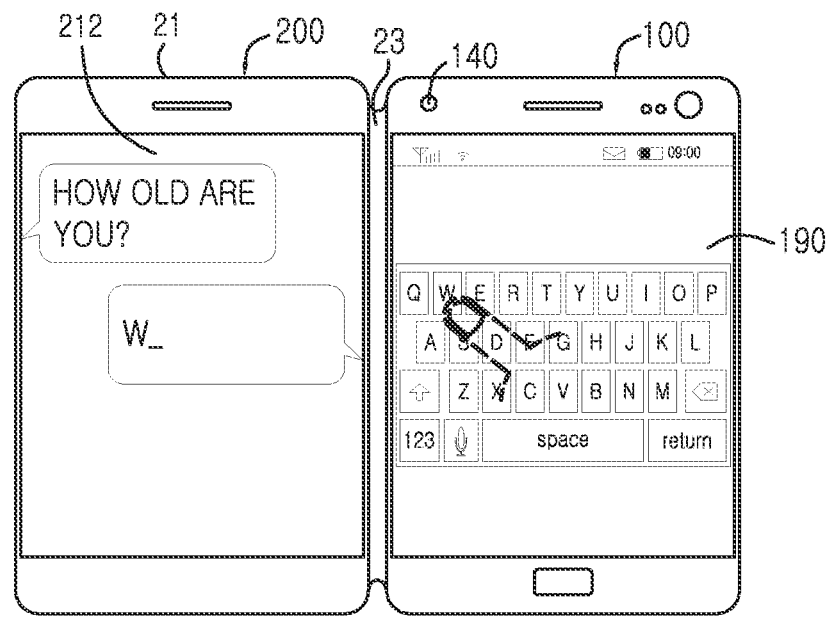

FIGS. 15B and 15C illustrate a screen based on a text message function in an electronic device and an electronic cover device according to an embodiment of the present disclosure.

Referring to FIG. 15B, when the text message function is performed and the screen of the touch screen 190 of the electronic device 100 is in the landscape mode, the electronic device 100 sets the screen of the touch screen 190 of the electronic device 100 and the screen of the inner display 212 of the first cover 21 of the electronic cover device to the landscape mode. Thereafter, when the inner display 212 of the electronic cover device is above the touch screen 190 of the electronic device 100, the electronic device 100 displays the text message on the screen of the inner display 212 of the electronic cover device and displays the keypad on the screen of the touch screen 190 of the electronic device 100. When the inner display 212 of the electronic cover device is below the touch screen 190 of the electronic device 100, which is not depicted in FIG. 15B, the electronic device 100 displays the keypad on the screen of the inner display 212 of the electronic cover device and displays the text message on the screen of the touch screen 190 of the electronic device 100.

Referring to FIG. 15C, when the text message function is performed and the screen of the touch screen 190 of the electronic device 100 is in the portrait mode, the electronic device 100 sets the screen of the touch screen 190 of the electronic device 100 and the screen of the inner display 212 of the first cover 21 of the electronic cover device to the portrait mode. Thereafter, when the inner display 212 of the electronic cover device is on the left of the touch screen 190 of the electronic device 100, the electronic device 100 displays the text message on the screen of the inner display 212 of the electronic cover device and displays the keypad on the screen of the touch screen 190 of the electronic device 100. When the inner display 212 of the electronic cover device is on the right of the touch screen 190 of the electronic device 100, which is not depicted in FIG. 15C, the electronic device 100 displays the keypad on the screen of the inner display 212 of the electronic cover device and displays the text message on the screen of the touch screen 190 of the electronic device 100.

Figure 16A:
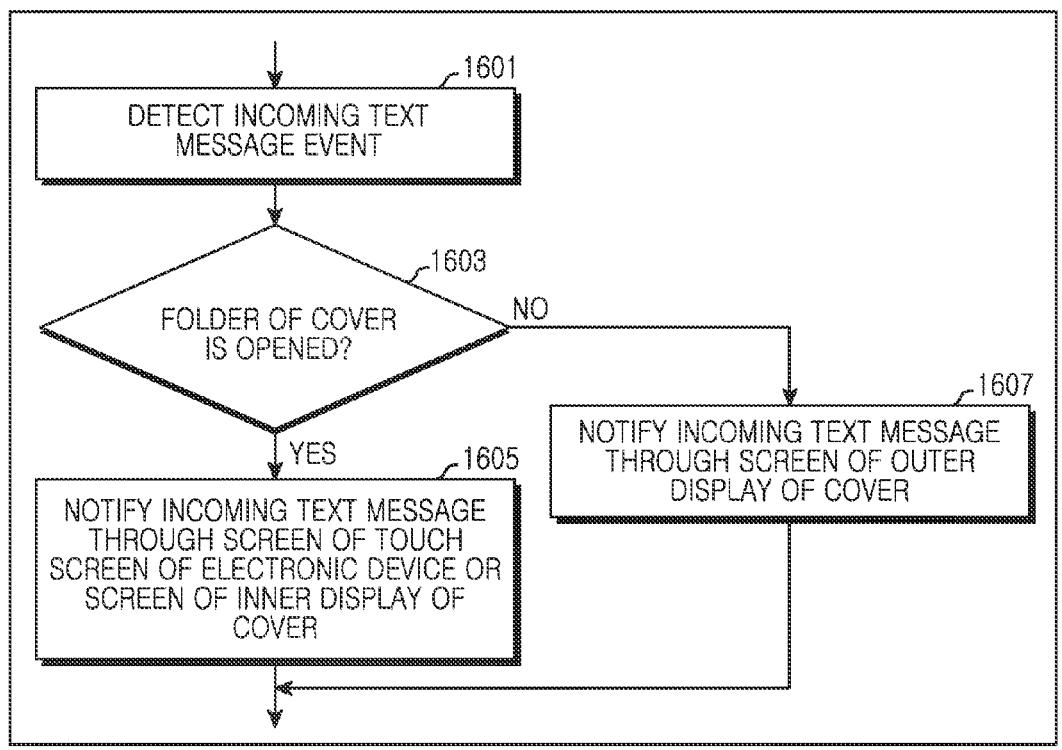
FIG. 16A is a flowchart of a method for notifying an incoming text message in an electronic device and an electronic cover device according to an embodiment of the present disclosure.

FIG. 16A is a flowchart of a method for notifying an incoming text message in an electronic device and an electronic cover device according to an embodiment of the present disclosure.

Referring to FIG. 16A, the processor 112 detects an incoming text message event in operation 1601.

In operation 1603, the processor 112 determines whether the first cover 21 of the electronic cover device is opened.

When the first cover 21 of the electronic cover device is opened, the processor 112 notifies the incoming text message through the screen of the touch screen 190 of the electronic device 100 or the screen of the inner display 212 of the electronic cover device in operation 1605.

When the first cover 21 of the electronic cover device is closed, the processor 112 notifies the incoming text message through the screen of the outer display 211 of the electronic cover device in operation 1607.

When the event, such as an incoming text message or a button press, does not occur during a certain time, the processor 112 enters a sleep mode. In the sleep mode, the touch screen 190 of the electronic device 100 and the outer display 211 and the inner display 212 of the electronic cover device are deactivated. The processor 112 detects the incoming text message in a periodic listening period in the sleep mode, activates any one of the touch screen 190 of the electronic device 100 and the outer display 211 and the inner display 212 of the electronic cover device according to whether the first cover 21 of the electronic cover device is opened, and notifies the incoming text message through the activated display. The method of FIG. 15A is not limited to the incoming text message but is applicable to various events, such as an incoming call, and the like.

Figure 16B:
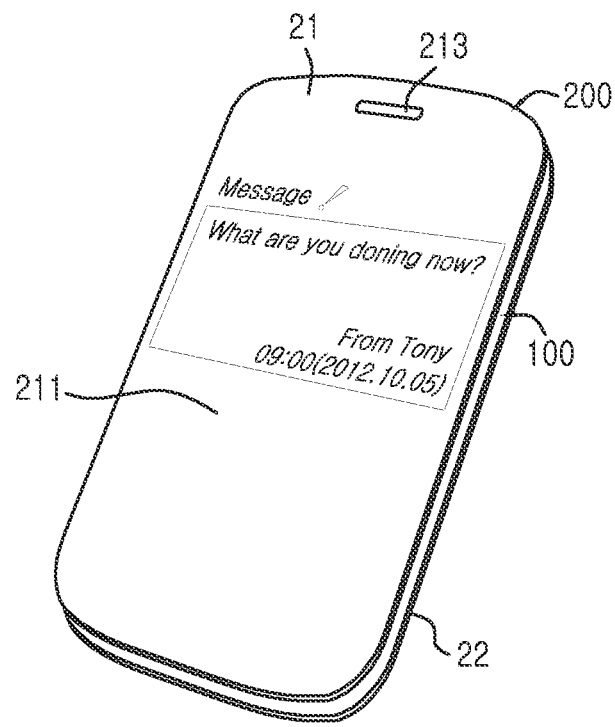
FIG. 16B illustrates a screen based on an incoming text message in an electronic device and an electronic cover device according to an embodiment of the present disclosure.

FIG. 16B illustrates a screen based on an incoming text message in an electronic device and an electronic cover device according to an embodiment of the present disclosure.

Referring to FIG. 16B, when the first cover 21 of the electronic cover device is closed, the electronic device 100 notifies the incoming text message through the screen of the outer display 211 of the electronic cover device. When the first cover 21 of the electronic cover device is opened (not shown), the electronic device 100 notifies the incoming text message through the screen of the touch screen 190 of the electronic device 100 or the screen of the inner display 212 of the electronic cover device. Herein, the outer display 211 of the electronic cover device can employ an EWD, an E-paper, and the like, with the low driving power.

FIGS. 17, 18, 19, 20, and 21 illustrate a multitasking screen of an electronic device and an electronic cover device according to an embodiment of the present disclosure. The multitasking concurrently performs a plurality of unrelated or related functions, and the functions can be displayed on the touch screen 190 of the electronic device 100 and the outer display (or touch screen) 211 and the inner display (or touch screen) 212 of the electronic cover device respectively.

Figure 17:
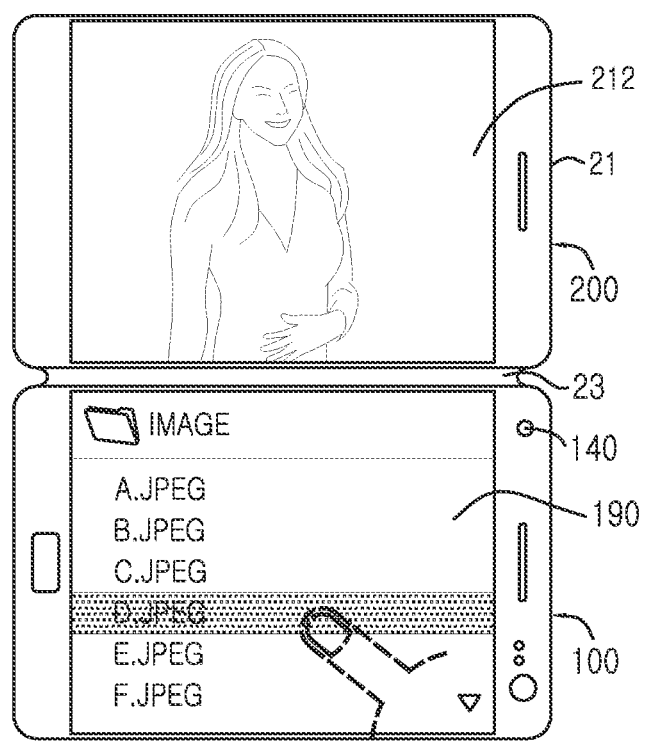
FIGS. 17, 18, 19, 20, and 21 illustrate a multitasking screen in an electronic device and an electronic cover device according to an embodiment of the present disclosure.

Referring to FIG. 17, the touch screen 190 of the electronic device 100 displays an image list. When the user touches an image in the image list, the touched image is viewed on the screen of the inner display 212 of the electronic cover device. Although it is not depicted in FIG. 17, when the user touches the displayed image on the screen of the inner display 212 of the electronic cover device, the screen of the touch screen 190 of the electronic device 100 may provide an image editing function (e.g., brightness control, color correction, and the like).

Figure 18:
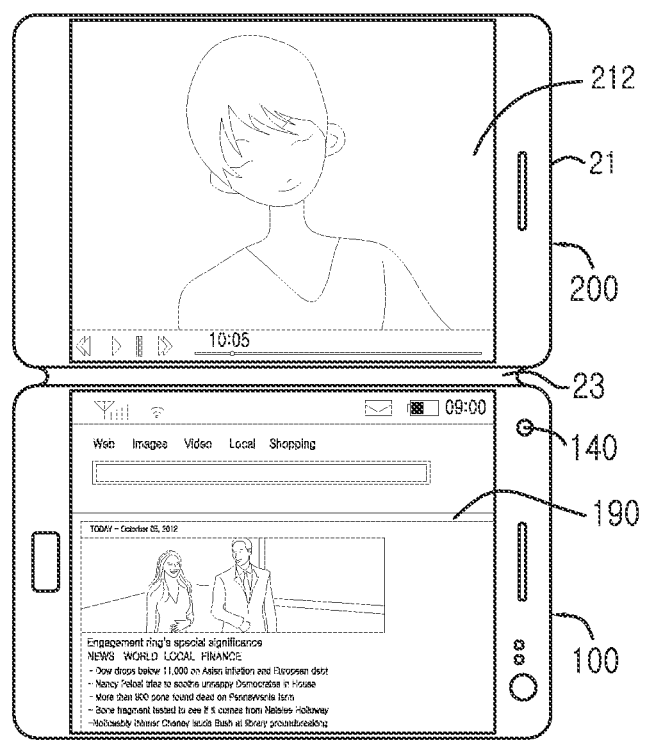

Referring to FIG. 18, the screen of the inner display 212 of the electronic cover device displays a video, and the screen of the touch screen 190 of the electronic device 100 displays a webpage. When the user touches the video content for viewing while browsing the webpage on the screen of the touch screen 190 of the electronic device 100, the inner display 212 of the electronic cover device displays the touched content. When the screen of the inner display 212 of the electronic cover device plays the video and the user touches a Social Networking Service (SNS) button on the screen of the inner display 212 of the electronic cover device, the screen of the touch screen 190 of the electronic device 100 may provide the SNS function. The SNS function serviced on the screen of the touch screen 190 of the electronic device 100 may include a forum for posting a user opinion about the video displayed on the screen of the inner display 212 of the electronic cover device. When the screen of the inner display 212 of the electronic cover device displays the video and the user touches a search button on the screen of the inner display 212 of the electronic cover device, the screen of the touch screen 190 of the electronic device 100 can provide video information (e.g., date, title, and the like).

Figure 19:
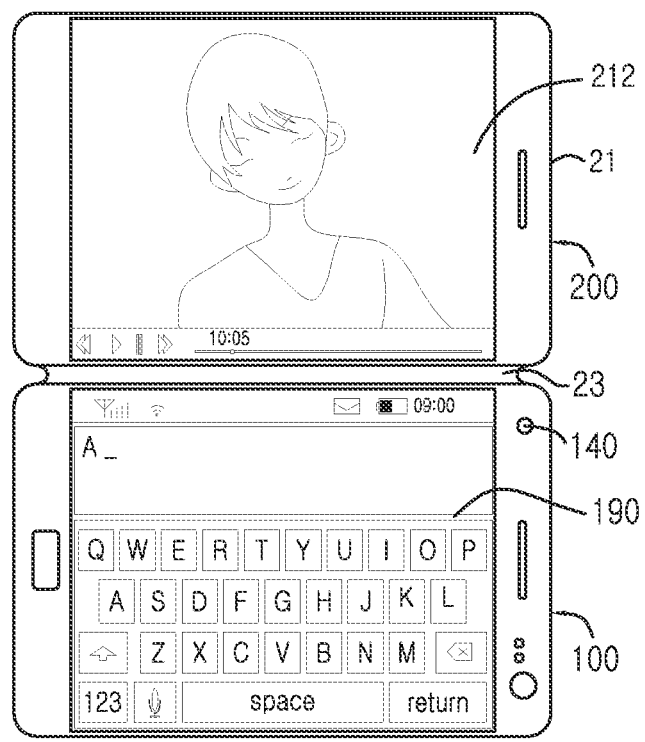

Referring to FIG. 19, when the screen of the touch screen 190 of the electronic device 100 plays the video and the text message is received, the inactive inner display 212 of the electronic cover device is activated and notifies the incoming text message. Herein, when the text message is received, the playing video can be continued or paused. To notify the incoming text message, a button for sending a reply message to the other party can be provided. When the user touches this button, the playing video is transferred from the touch screen 190 of the electronic device 100 to the inner display 212 of the electronic cover device and the touch screen 190 of the electronic device 100 provides a text message writing function (e.g., a keypad, and the like).

Figure 20:
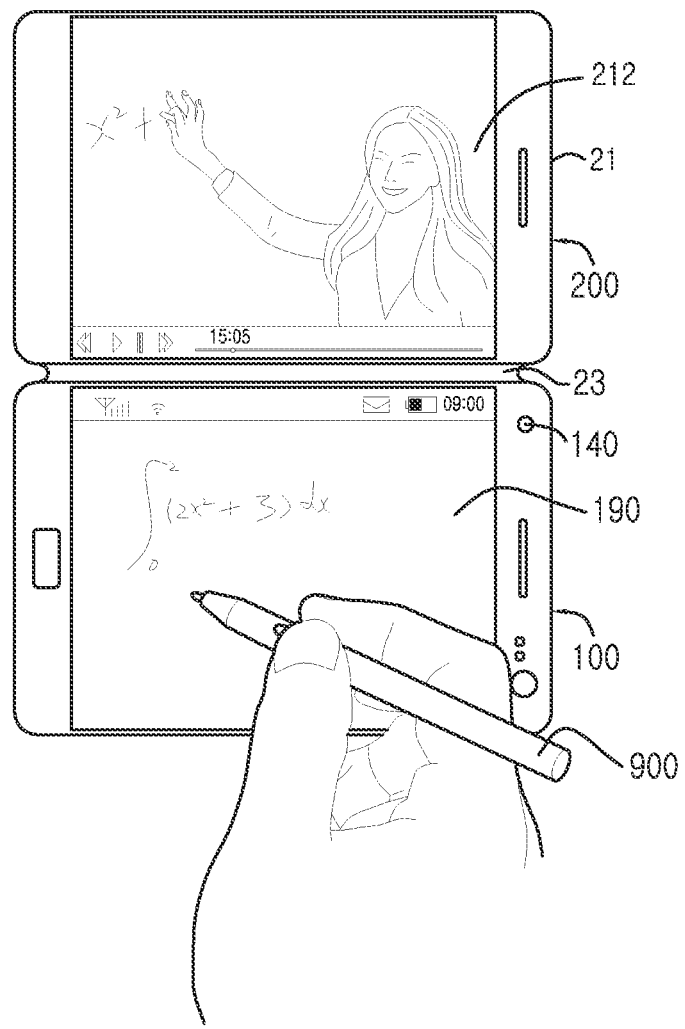

Referring to FIG. 20, when the screen of the inner display 212 of the electronic cover device displays an educational video, the screen of the touch screen 190 of the electronic device 100 provides a note window relating to the study. The user can make a note for the study using the stylus pen 900 in the note window. The electronic device 100 may function to print the note content or to send an e-mail.

Figure 21:
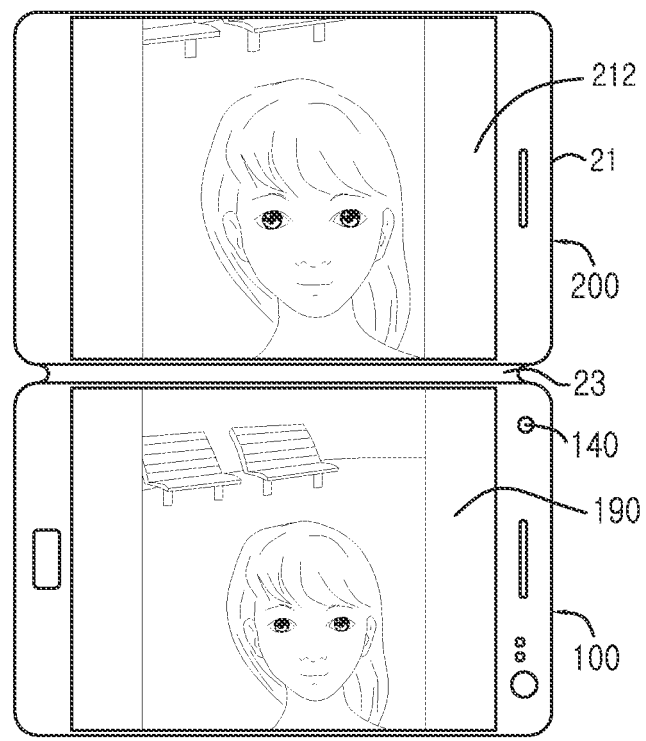

Referring to FIG. 21, the screen of the touch screen 190 of the electronic device 100 displays a preview image of an object captured by the camera 130 of the electronic device 100. The user can process the preview image, for example, adjust white balance, and capture the image by pressing a camera button. The captured image is displayed on the screen of the inner display 212 of the electronic cover device, and the screen of the touch screen 190 of the electronic device 100 displays the preview image of the camera 130 again and prepares for the image capturing. The user can compare the captured image displayed by the inner display 212 of the electronic cover device with the preview image of the camera 130 displayed by the touch screen 190 of the electronic device 100, and capture a new image by controlling an angle of the preview image, zoom-in or zoom-out, shutter speed, and image processing. The user may display an image fetched from a photo gallery on the screen of the inner display 212 of the electronic cover device, compare with the preview image of the camera 130 displayed by the touch screen 190 of the electronic device 100, and capture a new image by controlling the preview image. The screen of the inner display 212 of the electronic cover device may display the captured image, and the screen of the touch screen 190 of the electronic device 100 may display a tool application for editing (e.g., brightness control, color correction, and the like) the captured image.

Figure 22:
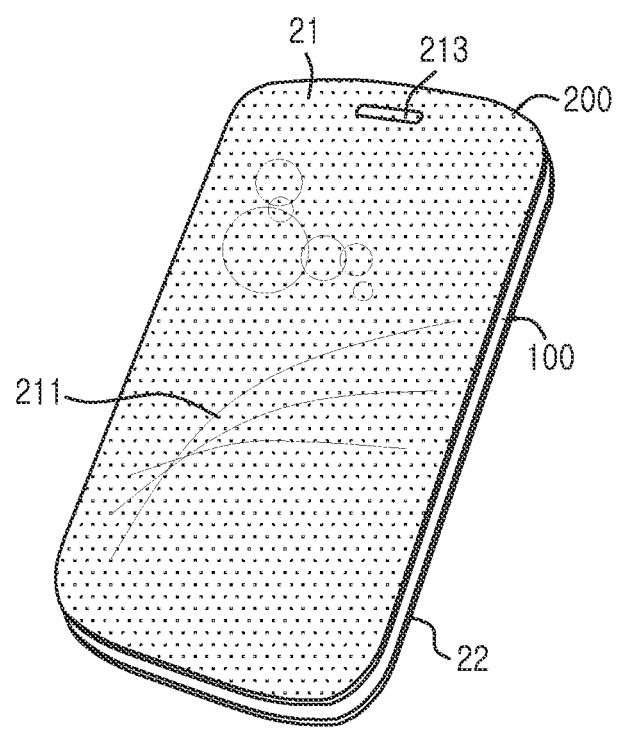
FIG. 22 illustrates an exterior design of an electronic device and an electronic cover device according to an embodiment of the present disclosure.

FIG. 22 illustrates an exterior design of an electronic device and an electronic cover device according to an embodiment of the present disclosure.

Referring to FIG. 22, when the first cover 21 of the electronic cover device covers the electronic device 100, the electronic device 100 deactivates the touch screen 190 of the electronic device 100 and the inner display 212 of the electronic cover device and outputs a certain image for decorating the exterior through the outer display 211 of the electronic cover device. The outer display 211 of the electronic cover device can employ an EWD, an E-paper, and the like, having the low driving power. For example, the electronic device 100 with the closed first cover 21 of the electronic cover device enters the sleep mode, and the outer display 211 of the electronic cover device displays such an image until the text message or the call is received.

A method for operating an electronic device including an electronic cover device includes coupling the electronic cover device to the electronic device, determining a type of the electronic cover device, and setting an interface based on the type of the electronic cover device.

The coupling to the electronic cover device may include recognizing the electronic cover device when a signal status periodically monitored is changed due to the electronic cover device mounted.

The coupling to the electronic cover device may include recognizing the electronic cover device by receiving a signal notifying the coupling from the electronic cover device.

The coupling to the electronic cover device may include recognizing the electronic cover device using at least one physical switch or at least one sensor.

The coupling to the electronic cover device may use at least one wireless communication scheme of Wireless Fidelity (WiFi), WiFi Direct, Near Field Communication (NFC), Bluetooth, and the like.

The determining of the type of the electronic cover device may obtain information of at least one input/output device of the electronic cover device, and determine the electronic cover device type based on the information.

The information of the at least one input/output device may include at least one of a type of the input/output device and a position of the input/output device.

The type of the input device may include at least one of a digitizer, a capacitive overlay touch panel, a resistance overlay touch panel, a surface acoustic wave touch panel, and an infrared beam touch panel.

The type of the output device may include at least one of an EWD, an E-paper, a PDP, an LCD, an OLED, an AMOLED, and the like.

The position of the input/output device may include at least one of a front side and a back side of the electronic cover device for covering or uncovering the electronic device.

The interface may selectively activate or deactivate the at least one input/output device of the electronic cover device.

The interface may include at least one operation according to a content or an application.

The interface may include at least one operation when the electronic cover device is opened or closed.

The interface may deactivate the input/output device of the electronic cover device exposed to outside when the electronic cover device is closed.

The interface may deactivate the input/output device of the electronic cover device not exposed to the outside when the electronic cover device is closed.

The interface may output an image through the output device of the electronic cover device exposed to outside when the electronic cover device is closed.

The interface may include at least one operation according to a motion of the electronic device.

The interface may set a portrait mode or a landscape mode of a screen of the at least one output device of the electronic cover device according to a rotation of the electronic device.

The interface may match the screen of the electronic device and the screen of the at least one output device of the electronic cover device according to the portrait mode or the landscape mode.

The interface may switch a content of the screen of the electronic device and a content of the screen of the at least one output device of the electronic cover device according to a rotation of the electronic device.

In multitasking, the interface may share at least one program provided through the at least one input/output device of the electronic cover device.

The interface may change a content of the screen of the electronic device or a content of the screen of the at least one output device of the electronic cover device according to a corresponding event of the electronic device or the input device of the electronic cover device.

The interface may switch the content of the screen of the electronic device and/or the content of the screen of the at least one output device of the electronic cover device according to the corresponding event of the electronic device or the input device of the electronic cover device.

The interface may scroll the content of the screen of the electronic device and the content of the screen of the at least one output device of the electronic cover device according to a corresponding touch event of the electronic device or the input device of the electronic cover device.

The interface may display a preview image of a captured image through the electronic device, and an image to be compared with the preview image may be displayed by the at least one output device of the electronic cover device.

When a low-resolution content is reproduced, the interface may display the content through the electronic cover device.

An electronic device includes a main body including a main display, an electronic device electrically or functionally coupled to the main body and covering at least a part of the main display, and a processor configured to determine a type of the electronic cover device and to set a user interface according the type of the electronic cover device.

The processor may obtain information of at least one input/output device of the electronic cover device, and determine the electronic cover device type based on the information.

The input device may include at least one of a digitizer and a touch panel.

The output device may include at least one of an EWD, an E-paper, a PDP, an LCD, an OLED, an AMOLED, and the like.

The input/output device may be disposed in at least one of a front side and a back side of the electronic cover device.

The user interface may selectively activate or deactivate the at least one input/output device of the electronic cover device.

The user interface may include at least one operation when the electronic cover device is opened or closed.

The user interface may include at least one operation according to a motion of the main body.

An electronic cover device may include a first cover corresponding to a first side of an electronic device and including at least one input/output device in a front side or a back side, and a second cover corresponding to a second side of the electronic device, removable, and communicating with the first cover.

The second cover may include an electrical connector configured to connect the electronic cover device in communication with the electronic device.

When the electronic device is fitted to the second cover, the second cover may send a signal notifying the connection to the electronic device.

At least one of the first cover and the second cover may send information of the input/output device to the electronic device.

The information of the input/output device may include at least one of a type and a position of the input device and the output device.

The input device may include at least one of a digitizer and a touch panel.

The output device may include at least one of an EWD, an E-paper, a PDP, an LCD, an OLED, an AMOLED, and the like.

The at least one input/output device may be activated or deactivated under control of the electronic device.

At least one of the first cover and the second cover may further include an antenna or a solar battery.

The electronic cover device is attached to the electronic device and protects the electronic device from the outside.

The user interface is not limited to the screen of the electronic device and is expanded to the screen of the electronic cover device to enhance its usability. In the multitasking method of the related art, the electronic device runs a program (i.e., a foreground program) displayed on the screen and a program (i.e., a background program) not displayed on the screen. Accordingly, all of the programs cannot be displayed on the single screen. Instead, the programs are displayed in turn or the single screen is segmented to several screens. However, the present multitasking can display the programs on the screen of the electronic device and the screen of the electronic cover device, thereby offering the usability and the convenience.

In place of the screen of the electronic device, the e-ink screen of the electronic cover device can reproduce the e-book content, thereby enhancing usability and convenience of accessing the e-book and reducing power consumption. In place of the screen of the electronic device, the e-ink screen of the electronic cover device can notify the event, such as a text message, a call, and the like. Therefore, the use and the convenience of the event notification are improved and power consumption is reduced.

In addition, the outer screen of the electronic cover device can display various images, thereby decorating the exterior of the electronic device.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device with a first screen, the method comprising:
    detecting that an electronic cover device is connected to the electronic device, wherein the electronic cover device is rotatably coupled to the electronic device and comprises a substantially planar surface that includes opposite first and second surfaces, and wherein the first surface conceals the first screen when the electronic cover device is rotated to cover the first screen;
    when it is determined that the electronic cover device includes a second screen disposed on the first surface:
        in response to a detection that the electronic cover device is rotated to cover the first screen, deactivating the first and second screens, and
        in response to a detection that the electronic cover device is rotated to open the first screen, activating at least one of the first screen and the second screen when displaying content;
    when it is determined that the electronic cover device includes a third screen disposed on the second surface:
        in response to a detection that the electronic cover device is rotated to cover the first screen, only activating the third screen when displaying the content, and
        in response to a detection that the electronic cover device is rotated to open the first screen, only activating the first screen when displaying the content; and
    when it is determined that the electronic cover device includes the second screen disposed on the first surface and the third screen disposed on the second surface:
        in response to a detection that the electronic cover device is rotated to cover the first screen, only activating the third screen when displaying the content, and
        in response to a detection that the electronic cover device is rotated to open the first screen, activating at least one of the first screen and the second screen when displaying content, and deactivating the third screen.

2. The method of claim 1, wherein the detecting that the electronic cover device is connected to the electronic device comprises at least one of recognizing the electronic cover device when a signal status periodically monitored is changed due to the electronic cover device mounted, recognizing the electronic cover device by receiving a signal notifying the coupling from the electronic cover device, and recognizing the electronic cover device using at least one physical switch or at least one sensor.

3. The method of claim 1, wherein the electronic device is connected to the electronic device via at least one wireless communication scheme of Wireless Fidelity (WiFi), WiFi Direct, Near Field Communication (NFC), and Bluetooth.

4. The method of claim 1, wherein at least one of the second screen and the third screen is configured to receive a touch input.

5. The method of claim 1, wherein at least one of the second screen and the third screen comprises one of an Electro Wetting Display (EWD), an E-paper, a Plasma Display Panel (PDP), a Liquid Crystal Display (LCD), an Organic LED (OLED), and an Active Matrix OLED (AMOLED).

6. The method of claim 1, further comprising:
    detecting a rotation of the electronic device; and
    setting the activated at least one screen to a portrait mode or a landscape mode based on the rotation of the electronic device.

7. The method of claim 1, further comprising:
    when it is determined that the electronic cover device includes the second screen disposed on the first surface, and it is detected that the electronic cover device is rotated to open the first screen, switching between content of the first screen of the electronic device and content of the second screen of the electronic cover device; and
    when it is determined that the electronic cover device includes the second screen disposed on the first surface and the third screen disposed on the second surface, and it is detected that the electronic cover device is rotated to open the first screen, switching between the content of the first screen of the electronic device and the content of the second screen of the electronic cover device.

8. The method of claim 1, further comprising:
    when it is determined that the electronic cover device includes the second screen disposed on the first surface, and it is detected that the electronic cover device is rotated to open the first screen, while executing a first program and a second program, displaying a first content based on the first program via the first screen, and displaying a second content based on the second program via the second screen; and
    when it is determined that the electronic cover device includes the second screen disposed on the first surface and the third screen disposed on the second surface, and it is detected that the electronic cover device is rotated to open the first screen, while executing the first program and the second program, displaying the first content based on the first program via the first screen, and displaying the second content based on the second program via the second screen.

9. The method of claim 1, further comprising:
    when it is determined that the electronic cover device includes the second screen disposed on the first surface, and it is detected that the electronic cover device is rotated to open the first screen, modifying at least one of a first content displayed via the first screen and a second content displayed via the second screen based on a touch input sensed on the first screen or the second screen; and when it is determined that the electronic cover device includes the second screen disposed on the first surface and the third screen disposed on the second surface, and it is detected that the electronic cover device is rotated to open the first screen, modifying at least one of the first content displayed via the first screen and the second content displayed via the second screen based on the touch input sensed on the first screen or the second screen.

10. The method of claim 1, further comprising:
when it is determined that the electronic cover device includes the second screen disposed on the first surface, and it is detected that the electronic cover device is rotated to open the first screen, scrolling at least one of a first content displayed via the first screen and a second content displayed via the second screen based on a touch input sensed on the first screen or the second screen; and
when it is determined that the electronic cover device includes the second screen disposed on the first surface and the third screen disposed on the second surface, and it is detected that the electronic cover device is rotated to open the first screen, scrolling at least one of the first content displayed via the first screen and the second content displayed via the second screen based on the touch input sensed on the first screen or the second screen.

11. The method of claim 1, further comprising:
when it is determined that the electronic cover device includes the second screen disposed on the first surface, and it is detected that the electronic cover device is rotated to open the first screen, displaying, via the first screen, image data obtained via a camera operatively coupled to the electronic device, and displaying, via the second screen, an image captured from the image data; and
when it is determined that the electronic cover device includes the second screen disposed on the first surface and the third screen disposed on the second surface, and it is detected that the electronic cover device is rotated to open the first screen, displaying, via the first screen, the image data obtained via the camera operatively coupled to the electronic device, and displaying, via the second screen, the image captured from the image data.

12. The method of claim 1, further comprising:
when low-resolution content is reproduced, displaying the low-resolution content via the second screen or the third screen of the electronic cover device instead of the first screen of the electronic device.

13. An electronic device comprising:
a first screen; and
a processor configured to:
detect that an electronic cover device is connected to the electronic device, wherein the electronic cover device is rotatably coupled to the electronic device and comprises a substantially planar surface that includes opposite first and second surfaces, and wherein the first surface conceals the first screen when the electronic cover device is rotated to cover the first screen,
when it is determined that the electronic cover device includes a second screen disposed on the first surface:
in response to a detection that the electronic cover device is rotated to cover the first screen, deactivate the first and second screens, and
in response to a detection that the electronic cover device is rotated to open the first screen, activate at least one of the first screen and the second screen when displaying content,
when it is determined that the electronic cover device includes a third screen disposed on the second surface:
in response to a detection that the electronic cover device is rotated to cover the first screen, only activate the third screen when displaying the content, and
in response to a detection that the electronic cover device is rotated to open the first screen, only activate the first screen when displaying the content, and
when it is determined that the electronic cover device includes the second screen disposed on the first surface and the third screen disposed on the second surface:
in response to a detection that the electronic cover device is rotated to cover the first screen, only activate the third screen when displaying the content, and
in response to a detection that the electronic cover device is rotated to open the first screen, activate at least one of the first screen and the second screen when displaying content, and deactivate the third screen.

14. The electronic device of claim 13, wherein the processor is further configured to:
detect a rotation of the electronic device, and
set the activated at least one screen to a portrait mode or a landscape mode based on the rotation of the electronic device.

15. The electronic device of claim 13, wherein the processor is further configured to:
when it is determined that the electronic cover device includes the second screen disposed on the first surface, and it is detected that the electronic cover device is rotated to open the first screen, switch between content of the first screen of the electronic device and content of the second screen of the electronic cover device, and
when it is determined that the electronic cover device includes the second screen disposed on the first surface and the third screen disposed on the second surface, and it is detected that the electronic cover device is rotated to open the first screen, switch between the content of the first screen of the electronic device and the content of the second screen of the electronic cover device.

16. The electronic device of claim 13, wherein the processor is further configured to:
when it is determined that the electronic cover device includes the second screen disposed on the first surface, and it is detected that the electronic cover device is rotated to open the first screen, while executing a first program and a second program, display a first content based on the first program via the first screen, and display a second content based on the second program via the second screen, and
when it is determined that the electronic cover device includes the second screen disposed on the first surface and the third screen disposed on the second surface, and it is detected that the electronic cover device is rotated to open the first screen, while executing the first program and the second program, display the first content based on the first program via the first screen, and display the second content based on the second program via the second screen.

17. The electronic device of claim 13, wherein the processor is further configured to:
when it is determined that the electronic cover device includes the second screen disposed on the first surface, and it is detected that the electronic cover device is rotated to open the first screen, modify at least one of a first content displayed via the first screen and a second content displayed via the second screen based on a touch input sensed on the first screen or the second screen, and
when it is determined that the electronic cover device includes the second screen disposed on the first surface and the third screen disposed on the second surface, and it is detected that the electronic cover device is rotated to open the first screen, modify at least one of the first content displayed via the first screen and the second content displayed via the second screen based on the touch input sensed on the first screen or the second screen.

18. The electronic device of claim 13, wherein the processor is further configured to:
when it is determined that the electronic cover device includes the second screen disposed on the first surface, and it is detected that the electronic cover device is rotated to open the first screen, scroll at least one of a first content displayed via the first screen and a second content displayed via the second screen based on a touch input sensed on the first screen or the second screen, and
when it is determined that the electronic cover device includes the second screen disposed on the first surface and the third screen disposed on the second surface, and it is detected that the electronic cover device is rotated to open the first screen, scroll at least one of the first content displayed via the first screen and the second content displayed via the second screen based on the touch input sensed on the first screen or the second screen.

19. The electronic device of claim 13, wherein the processor is further configured to:
when it is determined that the electronic cover device includes the second screen disposed on the first surface, and it is detected that the electronic cover device is rotated to open the first screen, display, via the first screen, an image data obtained via a camera operatively coupled to the electronic device, and display, via the second screen, an image captured from the image data, and
when it is determined that the electronic cover device includes the second screen disposed on the first surface and the third screen disposed on the second surface, and it is detected that the electronic cover device is rotated to open the first screen, display, via the first screen, the image data obtained via the camera operatively coupled to the electronic device, and display, via the second screen, the image captured from the image data.

20. The electronic device of claim 13, wherein the processor is further configured to:
when low-resolution content is reproduced, display the low-resolution content via the second screen or the third screen of the electronic cover device instead of the first screen of the electronic device.

21. An electronic cover device for an electronic device with a screen comprising:
a first cover, rotatably coupled to the electronic device, comprising at least one screen and a substantially planar surface that includes opposite first and second surfaces, wherein the first surface conceals the screen of the electronic device when the electronic cover device is rotated to cover the screen of the electronic device; and
a second cover for mounting the electronic device and configured to communicate with the electronic device,
wherein the second cover is configured to selectively activate the at least one screen of the first cover for displaying content under control of the electronic device, and
wherein the control of the electronic device is dependent on both the first surface and/or the second surface where the at least one screen of the first cover is disposed and whether the first cover is rotated to cover the screen of the electronic device.

22. The electronic cover device of claim 21, wherein the second cover comprises:
an electrical connector configured to connect the electronic cover device in communication with the electronic device.

23. The electronic cover device of claim 21, wherein, when the electronic device is fitted to the second cover, the second cover is configured to send a signal notifying the connection to the electronic device.

24. The electronic cover device of claim 21, wherein the second cover is configured to send information of the at least one screen of the first cover to the electronic device.

25. The electronic cover device of claim 21, wherein the at least one screen of the first cover is configured to receive a touch input.

26. The electronic cover device of claim 21, wherein the at least one screen of the first cover comprises one of an Electro Wetting Display (EWD), an E-paper, a Plasma Display Panel (PDP), a Liquid Crystal Display (LCD), an Organic LED (OLED), and an Active Matrix OLED (AMOLED).

27. The electronic cover device of claim 21, wherein at least one of the first cover and the second cover further comprises an antenna or a solar battery.

* * * * *